United States Patent
Miyashita et al.

(10) Patent No.: US 6,642,165 B2
(45) Date of Patent: Nov. 4, 2003

(54) WEAR RESISTANT MEMBER FOR ELECTRONIC EQUIPMENT, AND BEARING AND SPINDLE MOTOR THEREWITH

(75) Inventors: Kimiya Miyashita, Fujisawa (JP); Michiyasu Komatsu, Yokohama (JP); Hisao Yabe, Hiratsuka (JP); Minoru Takao, Yokohama (JP); Yukihiro Takenami, Tokyo (JP); Yoshiyuki Fukuda, Kawasaki (JP); Katsuhiro Shinosawa, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 123 days.

(21) Appl. No.: 09/927,930

(22) Filed: Aug. 13, 2001

(65) Prior Publication Data

US 2002/0098966 A1 Jul. 25, 2002

(30) Foreign Application Priority Data

| Aug. 21, 2000 | (JP) | P2000-249326 |
| Aug. 21, 2000 | (JP) | P2000-249327 |
| Aug. 30, 2000 | (JP) | P2000-260280 |
| Nov. 10, 2000 | (JP) | P2000-343094 |
| Jul. 26, 2001 | (JP) | P2001-226606 |

(51) Int. Cl.$^7$ .................. C04B 35/596; F16C 33/32; F16C 33/62
(52) U.S. Cl. .............. 501/97.4; 501/97.1; 501/87; 501/92; 384/492; 384/907.1; 264/683
(58) Field of Search .................. 501/87, 92, 97.1, 501/97.2, 97.3, 97.4; 384/492, 907.1; 264/683

(56) References Cited

U.S. PATENT DOCUMENTS

| 5,177,038 A | | 1/1993 | Takahashi et al. ............ 501/92 |
| 5,178,647 A | * | 1/1993 | Komatsu et al. .............. 51/307 |
| 5,238,882 A | | 8/1993 | Takahashi et al. ............ 501/92 |
| 5,316,987 A | * | 5/1994 | Yasutomi et al. .......... 501/97.2 |
| 5,439,856 A | * | 8/1995 | Komatsu .................... 501/97.2 |
| 5,575,571 A | * | 11/1996 | Takebayashi et al. ........ 384/492 |
| 5,744,410 A | * | 4/1998 | Komatsu et al. ........... 501/97.2 |
| 5,908,796 A | * | 6/1999 | Pujari et al. ................ 501/97.1 |
| 6,242,374 B1 | * | 6/2001 | Komatsu et al. ........... 501/97.2 |
| 6,508,591 B2 | * | 1/2003 | Niwa et al. ................. 384/492 |

FOREIGN PATENT DOCUMENTS

| JP | 2-43699 | 10/1990 |
| JP | 6-227870 | 8/1994 |
| JP | 7-29855 | 4/1995 |
| JP | 2566580 | 7/1996 |
| JP | 8-296649 | 11/1996 |
| JP | 11-223220 | 8/1999 |
| JP | 2000-314426 | 11/2000 |

* cited by examiner

*Primary Examiner*—Karl Group
(74) *Attorney, Agent, or Firm*—Foley & Lardner

(57) ABSTRACT

Wear resistant member for electronic equipment comprises a silicon nitride sintered body that contains conductivity enhancing particles, and has electrical resistivity in the range from 1 to $10^5$ Ω·m. In silicon nitride sintered body, agglomeration of conductivity enhancing particles in which distance between conductivity enhancing particles is less than 1 μm exists by 30% or less by area ratio per unit area. Wear resistant member is used for a bearing ball or the like, being applied in a rotation actuator of electronic equipment such as a magnetic recorder and optical disk drive. Malfunction of electronic equipment due to static electricity may be cancelled due to electrical resistivity that silicon nitride sintered body has.

26 Claims, 3 Drawing Sheets

WEAR RESISTANT MEMBER FOR ELECTRONIC EQUIPMENT, AND BEARING AND SPINDLE MOTOR THEREWITH

BACKGROUND OF THE INVENTION

1. Field of the Invention

The present invention relates to wear resistant member for electronic equipment in which malfunction due to static electricity is lessened, and a bearing and spindle motor therewith.

2. Related Art

In recent years, development of magnetic recorders such as hard disk drives (HDDS) and floppy disk drives (FDDs), optical disk drives such as CD-ROMs and DVDs, and various kinds of game machines is remarkable. In the electronic equipment, usually, a rotation actuator such as a spindle motor or the like makes a rotating shaft rotate at a high speed, thereby making various kinds of disks attached to the rotating shaft function.

So far, in bearing member supporting such rotating shaft, in particular in bearing balls, metal such as bearing steels or the like is mainly used. However, metal such as the bearing steels is insufficient in wear resistance. Accordingly, in a field where a high-speed rotation of 4,000 rpm or more is required like in the electronic equipment for instance, an increase of dispersion of life results in incapability of providing reliable rotation drive.

To overcome such malfunction, recently ceramic material such as a silicon nitride sintered body is in use for the bearing ball (cf., for instance, Japanese Patent Laid-open Publication No. JP-A 2000-314426). Among the ceramic materials, the silicon nitride sintered body is excellent in sliding properties and has excellent wear resistance. Accordingly, even when rotating at high speeds, rotation drive with mechanical reliability may be provided.

However, the silicon nitride bearing ball is electrically an insulator. Accordingly, there is a problem that when rotating at high speeds, generated static electricity cannot be skillfully liberated to the bearing member other than the rotating shaft or a bearing ball receiver made of metal such as bearing steels. Thus, when the static electricity cannot be skillfully dispersed and is built up unnecessarily on the bearing or peripherals, in a recorder that employs magnetic signals like the HDD for instance, a recording medium is adversely affected. As a result, there are worries that memory in the HDD may be lost, and furthermore the electronic equipment such as the HDD may be destroyed.

In addition, portable personal computers, electronic notebooks and various kinds of mobile products are yearly miniaturized, and to the HDDs or the like used therein demand for higher capacity and more miniaturization is yearly stronger. To cope with such demand, in the HDD for instance, further higher speed rotation is under study, and in the future it is expected to realize a high-speed rotation of 10,000 rpm or more. It is the rotating shaft and the bearing comprising the bearing balls and the bearing ball receiver that supports such high-speed rotation, excessive pressure thereof being substantially concentrated on the bearing balls.

In addition, when rotating at high speeds, on the basis of sliding of the bearing balls, an amount of generated heat (frictional heat) increases. The bearing ball made of the existing silicon nitride sintered body is such low in thermal conductivity as approximately 20 W/m·K. Accordingly, the frictional heat cannot be effectively dissipated. AS the rotation speed of the bearing becomes higher, lower heat dissipation capability causes more problems. From these circumstances also, the existing silicon nitride bearing ball is said cannot sufficiently cope with the high speed rotation of a long time.

On the other hand, a conductive silicon nitride sintered body of which electrical resistivity is approximately $10^{-5}$ Ω·m is known (cf. Japanese Patent Publication No. HEI 2-43699 JP-B). Such conductive silicon nitride sintered bodies are used in material for manufacturing a blade or nozzle of a turbine engine by means of electric discharge technique. Therein, a lot of conductivity enhancer such as metal carbides or metal nitrides is added to realize conductive property (lower electrical resistance). In such existing conductive silicon nitride sintered body, though electrical resistance itself may be lowered, much added conductivity enhancer agglomerates with ease, agglomerated particles of the conductivity enhancer causing to lower mechanical strength or the sliding properties of the silicon nitride sintered body.

For instance, in the use where compressive and/or tensile stress is repeatedly exerted to cause fatigue like in the case of the bearing balls, a number of agglomerated particles tend to cause cracks therefrom, resulting in largely deteriorating sliding properties. Accordingly, the existing conductive silicon nitride sintered body as disclosed in the above publication is very difficult to apply in the wear resistant member such as the bearing ball. The above publication does not assume to apply the conductive silicon nitride sintered body in the sliding member, but only assume to enhance electrical conductivity to make use of electric discharge machining.

Japanese Patent Publication No. HEI 7-29855 JP-B, Japanese Patent No. 2566580 and Japanese Patent Laid-open Publication No. HEI 6-227870 JP-A also disclose the silicon nitride sintered body including conductive compounds such as metal carbides or metal nitrides. In Japanese Patent Publication No. HEI 7-29855 JP-B, a silicon nitride sintered body is disclosed in which SiC in the range from 0.1 to 11% by mass is added to a concoction of silicon nitride and rare earth compound. In Japanese Patent No. 2566580 publication, a composite sintered body of silicon nitride and silicon carbide is disclosed. Furthermore, in Japanese Patent Laid-open Publication No. HEI 6-227870 JP-A, a composite sintered body is disclosed in which a dispersant such as silicon carbide or titanium nitride is dispersed in a silicon nitride matrix in three-dimensional network. However, the technologies disclosed in the publications cannot necessarily give the composite sintered body in which appropriate electrical conductive properties and excellent sliding properties are present at the same time.

Furthermore, in Japanese Patent Laid-open Publication No. HEI 8-296649 JP-A, ceramic material having volume resistivity of $10^4$ Ω·m or less is disclosed to apply in a dynamic pressure bearing having a spiral groove generating a dynamic pressure effect. However, ceramic materials used there are sintered bodies mainly composed of conductive ceramics such as SiC, TiC, TiN and $TiB_2$, the composite sintered body of $Al_2O_3$ and TiC, and the composite sintered body of $ZrO_2$ and NiO. That is, the ceramic materials in which excellent sliding properties and appropriate electrical conductive properties are present at the same time are not disclosed.

BRIEF SUMMARY OF THE INVENTION

Accordingly, an object of the present invention is to provide wear resistant member for electronic equipment that when applying in bearing balls or the like, may realize a high speed rotation with stability, and in addition suppress unnecessary build-up of static electricity. Furthermore, another object is to provide a bearing and a spindle motor that by the use of such wear resistant member for electronic equipment, enable to realize higher performance and higher reliability of the electronic equipment such as the magnetic recorders like the HDDs and the optical disk drives like the DVDs.

The present wear resistant member for electronic equipment is one that comprises a silicon nitride sintered body containing particles of conductivity enhancer and having electrical resistivity in the range from 1 to $10^5$ Ω·m. The silicon nitride sintered body comprises agglomerations of the particles of conductivity enhancer in which distances between the respective particles of conductivity enhancer are less than 1 μm, the agglomerations of the particles of conductivity enhancer being present in the range of 30% or less by area ratio per unit area in the silicon nitride sintered body.

In the present wear resistant member for electronic equipment, particles of conductivity enhancer to be contained in the silicon nitride sintered body are preferable to be at least one kind of compound selected from carbides and nitrides of 4A group elements, 5A group elements, 6A group elements, 7A group elements in the periodic table, silicon and boron. In particular, at least one kind selected from carbides of tantalum (Ta), titanium (Ti), niobium (Nb), tungsten (W), silicon (Si) and boron (B) is preferably used.

The present wear resistant members for electronic equipment are preferably used in the electronic equipment such as magnetic recorders such as the HDDs and FDDs, and optical disk drives such as the CD-ROMs and DVDs. As a specific shape of the present wear resistant member, a rolling element used in a rotation actuator of the above electronic equipment can be cited. The present wear resistant member is suitable for the bearing balls for the electronic equipment.

In the present wear resistant member for electronic equipment, a silicon nitride sintered body that has high strength and high hardness and is excellent in wear resistance is applied, electrical resistivity in the range from 1 to $10^5$ Ω·m being endowed to the silicon nitride sintered body that is originally an electrical insulator. In addition, the agglomerations of the particles of conductivity enhancer are made to exist by 30% or less by area ratio a unit area in the silicon nitride sintered body.

By compounding the above mentioned particles of conductivity enhancer in the silicon nitride sintered body, electrical resistivity in the range from 1 to $10^5$ Ω·m can be endowed to the silicon nitride sintered body. However, simple compounding of the particles of conductivity enhancer may cause dispersion in the electrical resistivity between the silicon nitride sintered bodies. In the present invention, the agglomerations of the particles of conductivity enhancer are made to exist in an appropriate proportion in the silicon nitride sintered body. By the presence of appropriate amount of the agglomerations of the particles of conductivity enhancer, the electrical resistivity between the silicon nitride sintered bodies may be suppressed from dispersing with reproducibility. When there are a number of agglomerations of the particles of conductivity enhancer, the agglomeration itself becomes a starting point of crack to deteriorate the sliding properties or the like. Accordingly, in the present invention, the agglomerations of the particles of conductivity enhancer are made to exist by 30% or less by area ratio.

In the present wear resistant member for electronic equipment, without damaging characteristics such as mechanical strength, hardness, fracture toughness and wear resistance all intrinsic to the silicon nitride sintered body, appropriate conductive properties are equally endowed to the silicon nitride sintered body. Accordingly, by the application of the silicon nitride sintered body having such characteristics in the bearing ball or the like, in addition to realization of stable high speed rotation, static electricity adversely affecting variously on the electronic equipment can be excellently released.

The present bearing comprises a bearing ball made of the above wear resistant member for electronic equipment of the present invention. The present spindle motor comprises the bearing of the present invention. As a specific shape of the present spindle motor, a structure comprising a fixed shaft, a rotor and a stator can be cited. The bearing is attached to the fixed shaft. The rotor is supported rotatably through the bearing to the fixed shaft and has a rotor magnet. The stator has a stator coil disposed facing the rotor magnet with a prescribed gap.

DETAILED DESCRIPTION OF THE INVENTION

Figure 1:
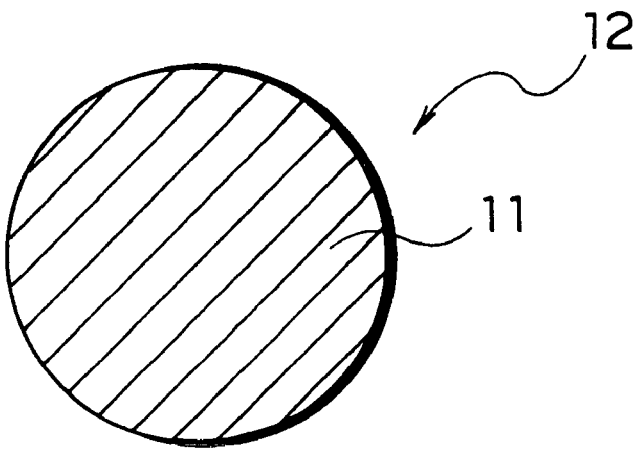
FIG. 1 is a sectional view showing a configuration of a bearing ball according to a first embodiment of the present invention.

In the following, modes for implementing the present invention will be explained.

The present wear resistant member for electronic equipment comprises a silicon nitride sintered body of which electrical resistivity is in the range from 1 to $10^5$ Ω·m. The silicon nitride sintered body here denotes a sintered body of which main component is silicon nitride. The silicon nitride itself is intrinsically an insulating material and has in general electrical resistivity of $10^8$ Ω·m or more. Accordingly, when applying in the HDDs or the like as it is, the static electricity cannot be removed.

In the present invention, the electrical resistivity in the range from 1 to $10^5$ Ω·m is endowed to the silicon nitride sintered body. By endowing the electrical resistivity of $10^5$ Ω·m ($10^7$ Ω·cm) or less to the silicon nitride sintered body, when applying in the electronic equipment such as the HDDs for instance, the static electricity generated due to the high speed rotation can be excellently released to a bearing member made of metal such as a rotating shaft or a ball receiver. Accordingly, malfunction accompanying the static build-up may be cancelled. When the electrical resistivity of the silicon nitride sintered body exceeds $10^5$ Ω·m, sufficient conduction of the static electricity cannot be secured.

On the other hand, when the electrical resistivity of the silicon nitride sintered body is less than 1 Ω·m ($10^2$ Ω·cm), not only the more effect than the above cannot be obtained for the dissipation of the static electricity, but also a lot of particles of the conductivity enhancer becomes necessary to add to obtain such low electrical resistivity. When compounding a lot of particles of the conductivity enhancer in the silicon nitride sintered body, many agglomerations between the particles of the conductivity enhancer are caused, thereby mechanical characteristics such as the fracture toughness and wear resistance of the silicon nitride sintered body may be damaged. The electrical resistivity of the silicon nitride sintered body is more preferable to be in the range from 10 to $10^4$ Ω·m.

The present wear resistant member for electronic equipment, specifically, in the rotation actuators of the various electronic equipment, is used as a rolling element of the bearing for instance. The present wear resistant member is suitable for the bearing ball for the electronic equipment. The shape of the bearing ball is generally spherical. However, the shape of the rolling elements therein the present invention is applied is not necessarily restricted to ball, but may be cylindrical or bar-like. The present invention may be applied in various bearings such as ball bearings, roller bearings, dynamic pressure bearings or the like.

Furthermore, the present wear resistant member for electronic equipment is applicable in various electronic equipment having the rotation actuator. As such electronic equipment, the magnetic recorders such as the HDDs and the FDDs, the optical disk drives such as the CD-ROMs and the DVDs and various kinds of game machines can be cited. The optical disk drives include various optical recorders such as magneto-optical recorders, phase transition type magneto-optical recorders and playback-only optical disk drives. Furthermore, other than these, in whatever electronic equipment that has the rotation actuator, the present invention can be applied.

Figure 5:
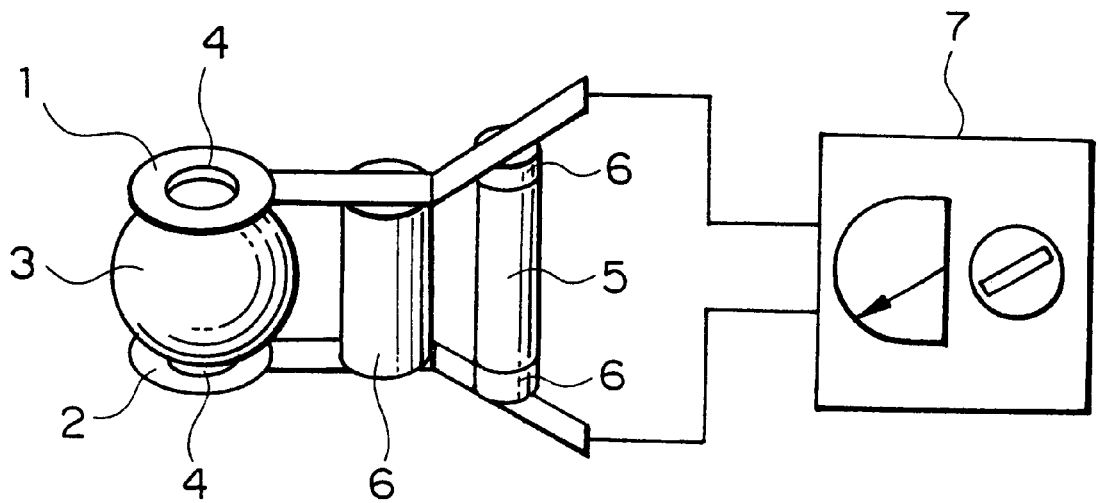
FIG. 5 is a diagram showing an example of measurement of electrical resistivity of a bearing ball.

In the present invention, the electrical resistivity of the silicon nitride sintered body basically denotes the volume resistivity. An example of measurement of the electrical resistivity when the present wear resistant member is applied in the bearing ball is shown in the following with reference to FIG. 5. As electrodes 1 and 2 for measurement of the electrical resistivity, one that has an opening 4 corresponding to a diameter of the bearing ball 3 in the center is used. With such electrodes 1 and 2 for measurement, the bearing ball 3 is sandwiched from above and below. Force against the bearing is controlled by means of a spring 5 or the like. In the figure, reference numerals 6 and 7 denote an insulator and a tester, respectively. Thus measured volume resistivity is the electrical resistivity of the present bearing ball 3.

In the present wear resistant member for electronic equipment, in order to obtain the above electrical resistivity in the range from 1 to $10^5$ Ω·m, conductive material is added in the silicon nitride sintered body as particles of conductivity enhancer. The particles of conductivity enhancer are preferable to have electrical resistivity of $10^{-5}$ Ω·m ($10^{-3}$ Ω·cm) or less. When the electrical resistivity of the particles of conductivity enhancer exceeds $10^{-5}$ Ω·m, an amount to be compounded to endow prescribed electrical resistivity to the silicon nitride sintered body increases. Accordingly, mechanical characteristics or the like of the silicon nitride sintered body may deteriorate.

As such particles of conductivity enhancer, various materials such as carbides, nitrides, borides and metals that can control the electrical resistivity of the silicon nitride sintered body may be used. Among these, at least one kind selected from carbides and nitrides of 4A group elements, 5A group elements, 6A group elements and 7A group elements in the periodic table, silicon and boron is preferably used. The above periodic table is one according to the Japanese style, the above 4A group elements, 5A group elements, 6A group elements and 7A group elements correspond to 4B group elements, 5B group elements, 6B group elements and 7B group elements in US style periodic table. The carbides and nitrides are chemically stable and excellent in heat resistance. Accordingly, the bearing balls, when slid, are less adversely affected by generated heat. The particles of conductivity enhancer can be analyzed by means of EPMA and X-ray diffraction.

As the particles of conductivity enhancer, in particular at least one kind selected from carbides of tantalum (Ta), titanium (Ti), niobium (Nb), tungsten (W), silicon (Si) and boron (B) is preferably used. When the present wear resistant member is used in the bearing balls or the like, the particles of conductivity enhancer themselves are naturally slid together with the silicon nitride sintered body. Accordingly, since also to the particles of conductivity enhancer, a certain degree of sliding properties is demanded, the above carbides excellent in the sliding properties are preferably used. Furthermore, the carbides, being also excellent in thermal conduction property, contribute in an improvement of thermal conductivity of the silicon nitride sintered body.

Furthermore, in the present wear resistant member for electronic equipment, the particles of both the carbides and nitrides can be effectively used in combination. The specific examples of the particles of the carbide are as given above. As the particles of nitrides, the nitrides of 4A group elements are preferably used, in particular, titanium nitride being desirable to use. The nitrides of 4A group elements function not only as the conductivity enhancer but also as a sintered additive. Titanium nitride is particularly effective therein. When dispersing the particles of nitride of 4A group element to incorporate, an oxide of 4A group element may be compounded in raw material to form nitride during the sintering. Thereby, sintering properties of the silicon nitride sintered body may be improved.

The particles of conductivity enhancer comprising the above carbides or nitrides are preferable to have a shape of which average particle diameter is 2 μm or less. Furthermore, the particles of the conductivity enhancer are preferable to be 4 μm or less in the maximum diameter, more preferable to be 2 μm or less, desirably to be in the range from 0.3 to 1.2 μm. By the use of such particles of carbides or nitrides, the particles of the conductivity enhancer can be appropriately dispersed in the silicon nitride sintered body. On the contrary, when whisker or fiber is used as the conductivity enhancer, there are worries that these may exist as thorny projections on a surface of the bearing ball. When there are thorny projections on the surface, aggressiveness against a counterpart becomes high during the sliding and cracks may start therefrom. The maximum diameters of the particles of the conductivity enhancer are sizes of individual particles, denoting the longest diagonals of the particles of the conductivity enhancer when seeing enlarged photographs of the surface or section of the silicon nitride sintered body or color mapping of EPMA.

When employing the carbide particles and nitride particles in combination, it is preferable for the average particle diameter of the nitride particles to be larger than that of the carbide particles. Specifically, the average particle diameter of the carbide particles is preferable to be in the range from 0.3 to 1 μm, and that of the nitride particles is preferable to be in the range from 1 to 2 μm. When the particles of the carbide are contained more than that of the nitride, excessive agglomeration of the carbide particles may occur. In order to suppress excessive agglomeration of the carbide particles from occurring, the average particle diameter of the carbide particles is preferable to be smaller than that of the nitride particles.

An amount of particles of the conductivity enhancer to be compounded, in accordance with the electrical resistivity of the particles of the conductivity enhancer to be used, is appropriately adjusted so that the electrical resistivity of the silicon nitride sintered body comes in the range from 1 to $10^5$ Ω·m. For instance, the carbide or nitride, when being used as the particles of conductivity enhancer, is preferably contained by 35% by volume or less with respect to a total amount of the entire silicon nitride sintered body. The amount of the particles of the conductivity enhancer to be compounded is furthermore preferable to be in the range from 5 to 25% by volume. When considering making the electrical resistivity of the silicon nitride sintered body only a prescribed value, the conductivity enhancer may be contained by 35% or more by volume. However, when containing too much, characteristics such as the hardness, wear resistance and fracture toughness intrinsic to the silicon nitride sintered body may deteriorate. When the content of the particles of the conductivity enhancer is less than 5% by volume, v since the electrical resistivity can be controlled to a prescribed value with difficulty, it is not so preferable.

The content (% by volume) of the particles of the conductivity enhancer in the present invention can be obtained by specifying from an area ratio of the particles of the conductivity enhancer present per for instance unit area (100×100 μm). At that time, the area ratio of the particles of the conductivity enhancer per unit area is measured in arbitrary three points or more, preferably in two points each on a surface and a section in total of four, being shown by an average value of these measurements.

In the wear resistant member of the present invention, in addition to the above particles of the conductivity enhancer, an iron component in the range from 10 to 200 ppm can be effectively contained in the silicon nitride sintered body to improve electrical conductivity. The iron component here denotes all components containing iron such as simple iron element, iron compounds such as iron nitride and iron oxide, and so on. The iron component may be an impurity in the raw material or may be contained by adding a shortfall in the silicon nitride sintered body. The content of the iron component in the sintered body is obtained in the following way. First, the sintered body is finely pulverized, thereafter, a mixed acid of nitric acid and hydrofluoric nitric acid is added, followed by heating at a temperature of 180° C. in a pressurized container to convert into a solution. Then, hydrofluoric acid is washed away with sulfuric acid, thereafter to the solution ICP atomic emission spectrometry being implemented to obtain the content of the iron component.

When the content of the iron component in the silicon nitride sintered body exceeds 200 ppm, the silicon nitride sintered body tends to be fractured when using as the sliding member such as the bearing balls. On the other hand, in view of effectively obtaining an improvement effect of electrical conductive properties due to the iron, the content of the iron component is preferable to be 10 ppm or more. Furthermore, the maximum diameter of the iron component is preferable to be 20 μm or less. When the maximum diameter of the iron component exceeds 20 μm, the iron component itself may be a starting point of fracture. The maximum diameter of the iron component is preferable in the range from 2 to 20 μm.

In the present wear resistant member, the particles of the conductivity enhancer partially form agglomerations, such agglomerations of the particles of the conductivity enhancer being present in the silicon nitride sintered body in the range of 30% or less by area ratio per unit area. The agglomeration of the particles of the conductivity enhancer here denotes an aggregate in which the particles of the conductivity enhancer are in direct contact (gap between the particles is 0 μm) or in which distances between the particles of the conductivity enhancer are less than 1 μm. The aggregate comprises two or more pieces of the particles of the conductivity enhancer. In view of an improvement effect of the electrical conductivity, the agglomeration (aggregate) preferably comprises approximately 2 to 5 particles of the conductivity enhancer.

In view of the sliding properties only of the wear resistant member such as the bearing ball, it is preferable that the agglomeration of the particles of the conductivity enhancer is not present. However, when there is no agglomerations, the electrical resistivity of the silicon nitride sintered body largely fluctuates. That is, when paying attention only to lowering the electrical resistivity of the silicon nitride sintered body, an appropriate amount of particles of the conductivity enhancer need only be added. However, in the case of the silicon nitride sintered body being applied in the bearing balls for the electronic equipment, if there is dispersion in values of the electrical resistivity of the individual bearing balls, malfunction may be caused in a static build-up prevention effect. The static electricity basically builds up in a place where the electrical resistivity is high (place high in insulating properties). Accordingly, when there is dispersion in the electrical resistivity of the bearing ball, the static electricity concentrates at a position where the electrical resistivity is the highest, resulting in malfunction of the electronic equipment due to the static electricity.

Such phenomena does not cause significant problems when the bearing ball is actuated at a rotation number of approximately 4,000 rpm for instance. However, when the rotation number goes up to 7,200 rpm or more, furthermore of 10,000 rpm or more, the concentration of the static electricity due to the dispersion of the electrical resistivity of the bearing ball tends to be conspicuous. In particular, the malfunction of the electronic equipment due to the build-up of the static electricity is also influenced by an instant amount of static electricity. Accordingly, in the case of a plurality of balls being used in combination like in the case of the bearing, it is important to suppress the dispersion of the electrical resistivity between the plurality of bearing balls lower.

From such circumstances, in the present invention, the agglomerations of the particles of the conductivity enhancer are contained in the silicon nitride sintered body in the range of 30% or less by area ratio per unit area. By making appropriately contain the agglomerations of the particles of the conductivity enhancer in the silicon nitride sintered body, the dispersion of the electrical resistivity between the plurality of the silicon nitride sintered bodies may be suppressed with reproducibility. Specifically, among for instance 100 pieces of the silicon nitride sintered bodies (bearing balls or the like), the dispersion of the electrical resistivity may be suppressed to ±15% or less. However, when there are excessive agglomerations of the particles of the conductivity enhancer, the wear resistance or fracture toughness deteriorates. Accordingly, the agglomerations of the particles of the conductivity enhancer are made to be present in the range of 30% or less by area ratio.

In obtaining the above suppression effect of the dispersion of the electrical resistivity of the silicon nitride sintered bodies, the agglomerations of the particles of the conductivity enhancer are preferable to be present by 2% or more by area ratio per unit area. When the area ratio of the agglomerations of the particles of the conductivity enhancer is less than 2% by area ratio, a ratio of the agglomerations in the sintered body texture is low to result in larger dispersion of the electrical resistivity. For instance, in the silicon nitride sintered body less in the agglomerations, the electrical resistivity does not go down so much, resulting in, in many cases, the electrical resistivity larger than a target value. This is because the particles of the conductivity enhancer are separated from each other and an effect lowering the electrical resistivity becomes insufficient. By partially agglomerating the particles of the conductivity enhancer to obtain the lowering effect of the electrical resistivity, the electrical resistivity may be stabilized in the prescribed range.

On the other hand, when the area ratio of the agglomerations of the particles of the conductivity enhancer exceeds 30%, the dispersion itself of the electrical resistivity assuredly becomes smaller. However, because there are excessive agglomerations in the silicon nitride sintered body, the agglomerations may become starting points of fracture to lower mechanical strength. In particular, the agglomerations of the particles of the conductivity enhancer exist also on the surface of the bearing ball or the like and work as part of a sliding surface. Accordingly, when there are too many agglomerations of the particles of the conductivity enhancer, in the use where fatigue is caused due to constant repetition of compressive and/or tensile stress like in the bearing ball, fracture tends to start from the agglomerations. As a result, the excellent wear resistance intrinsic to the silicon nitride sintered body may not be exhibited. In the bearing balls, rolling fatigue life deteriorates. From the above, in the present wear resistant member for electronic equipment, it is important to set the area ratio of the agglomerations of the particles of the conductivity enhancer 30% or less.

Even though there are the agglomerations of the particles of the conductivity enhancer in a prescribed area ratio, when size of the agglomeration of the particles of the conductivity enhancer is too large, the fracture starting from the agglomeration tends to occur. Thereby, mechanical strength and wear resistance (sliding properties) of the silicon nitride sintered body are lowered. Accordingly, the size of the agglomeration of the particles of the conductivity enhancer is preferable to be 10 $\mu$m or less at a maximum diameter. The maximum diameter of the agglomeration is more preferable to be 5 $\mu$m or less, furthermore preferable to be 3 $\mu$m or less.

In the wear resistant member of the present invention, when the agglomerations of the particles of the conductivity enhancer are contained by the prescribed area ratio, the electrical resistivity of the silicon nitride sintered body may be suppressed in dispersion. However, when the agglomerations each are too close, apparent size of the agglomerations becomes large. Such agglomerations, similarly with ones of which maximum diameter exceed 10 $\mu$m, may tend to be the starting points of fracture and to deteriorate the sliding properties. Accordingly, the distance between the agglomerations is preferable to be in the range from 2 to 10 $\mu$m. When the distance between the agglomerations is less than 2 $\mu$m, the fracture tends to start from the agglomeration. On the other hand, when the distance between the agglomerations exceeds 10 $\mu$m, the effect of the agglomeration deteriorates, and the dispersion of the electrical resistivity tends to be larger.

Furthermore, also of the particles of the conductivity enhancer that do not form the agglomeration, when the particles of the conductivity enhancer are distanced far, an effect of endowing conductivity deteriorates. Accordingly, the distance between the particles of the conductivity enhancer is preferable to be in the range from 1 to 15 $\mu$m. The distance between the particles of the conductivity enhancer that do not agglomerate is more preferable to be in the range from 3 to 10 $\mu$m. When in such ranges, without deteriorating the intrinsic sliding properties of the silicon nitride sintered body, the dispersion of the electrical resistivity may be furthermore decreased. Specifically, the dispersion of the electrical resistivity values per for instance 100 pieces of the silicon nitride sintered bodies (bearing balls or the like) may be suppressed to ±10% or less.

When the silicon nitride sintered body contains, in addition to the particles of the conductivity enhancer, the iron component, the distances between the iron components themselves and between the iron component and particle of the conductivity enhancer are preferable to be in the range from 0.5 to 5 $\mu$m. Furthermore, it is preferable that the particles satisfying such physical relationship occupy 80% or more. In a microstructure where the distances between the iron components themselves and between the iron component and particle of the conductivity enhancer are far separated even in the nearest, the effect of lowering the electrical resistivity may not be sufficiently obtained, and the dispersion of the electrical resistivity tends to increase. Accordingly, it is preferable to make the distances between the iron components themselves and between the iron component and particle of the conductivity enhancer approach appropriately, and to equalize also the distribution thereof.

The above area ratio of the agglomerations of the particles of the conductivity enhancer is obtained in the following ways. First, a section or a surface of a sintered body is processed to be a mirror surface (0.01 $\mu$m or less in terms of surface roughness Ra), elementary analysis of an arbitrary measuring point on the surface being implemented by means of Electron Probe Micro-Analyzer (EPMA). The analysis by means of EPMA is implemented on unit area of 30×30 $\mu$m (or more than that area) and a color map showing an element distribution is prepared. By the use of the color map, a total area of the agglomerations of the particles of the conductivity enhancer present in the unit area is measured. Thereby, the area ratio of the agglomerations in the silicon nitride sintered body is obtained. The area ratio of the agglomerations in the present invention, after obtaining the area ratios of the agglomerations per unit area at arbitrary four or more measuring points by means of the above method, is preferably obtained by averaging these measurements.

The color map due to the EPMA is preferably prepared with a magnification of 2000 times (displaying 50 $\mu$m in 100 mm) or more. When observing the section or surface of the silicon nitride sintered body with the magnification of this degree or more, the dispersion of the area ratio of the agglomerations of the particles of the conductivity enhancer per unit area becomes smaller. In obtaining the area ratio of the agglomerations of the particles of the conductivity enhancer in the silicon nitride sintered body, the unit area of at least 30×30 $\mu$m may make a measurement error of the area ratio smaller. Accordingly, the measurement in the present invention is implemented on an area of at least 30×30 $\mu$m as unit area.

When preparing the color map by means of the EPMA, for a spherical sample like the bearing ball, ends of the color map, being photographed curved, are considered do not show an accurate state of agglomeration of the particles of the conductivity enhancer. However, in photographing the minute area such as unit area of 30×30 $\mu$m, such points, if not being considered, do not substantially cause problems. From also these viewpoints, the unit area is preferably set at 30×30 μm.

In the present invention, the size (maximum diameter) of the agglomerations of the particles of the conductivity enhancer, the distance between the agglomerations themselves, and the distance between the particles of the conductivity enhancer that do not form the agglomeration also are obtained similarly from the color map due to the EPMA of the section or surface of the sintered body. The respective values thereof also are preferably measured of arbitrary four or more points and shown by the average values thereof. Of values stipulated for other fine structure, the values obtained on the identical measurement method are basically shown. It is effective in some cases to use comparison between the color map due to the EPMA and a secondary electron image due to a scanning electron microscope (SEM).

In the present wear resistant member for electronic equipment, the particles of the conductivity enhancer are preferably dispersed so that the number of the particles of the conductivity enhancer in an arbitrary straight-line distance of 30 μm in the silicon nitride sintered body is from 5 to 20 pieces, being more preferable to be from 8 to 13 pieces. The number of the particles of the conductivity enhancer is measured in the following ways. First, an enlarged photograph of an arbitrary surface or a section is taken, on the photograph a straight-line (width of 0.5 mm or less) corresponding to 30 μm is arbitrarily drawn, and the number of the particles of the conductivity enhancer on the straight-line is counted.

In counting the number of pieces of the particles of the conductivity enhancer on the straight-line distance of 30 μm, individual particles are counted one by one. Accordingly, one in which there are many particles like the agglomerations is not counted as one particle on the line, but is counted as the number of the respective particles constituting the agglomerated particles. For instance, when there are one agglomeration and two particles of the conductivity enhancer that do not agglomerate in the straight-line distance of 30 μm, the number of the particles of the conductivity enhancer is not three pieces, but the number of the individual particles in the agglomeration present on the straight-line distance of 30 μm is counted. That is, assuming that the agglomeration contains four particles of the conductivity enhancer (needless to say, all four are on the straight-line distance of 30 μm), together with the above two particles of the conductivity enhancer that do not agglomerate, the number of the particles of the conductivity enhancer on the straight-line distance 30 μm is counted as six pieces in total.

When measuring the number of the particles of the conductivity enhancer, the photograph is preferable to be enlarged by 2000 times or more. In the case of the surface or the section of the silicon nitride sintered body being observed with the magnification to this extent or more, a straight-line corresponding to a straight-line distance 30 μm is drawn. At this juncture, a line width of 0.5 mm or less, in view of counting the number of the particles of the conductivity enhancer, causes less dispersion in judging whether touching the straight-line or not. In counting the number of the particles of the conductivity enhancer in the silicon nitride sintered body, the straight-line distance 30 μm enables to make the dispersion of the number of the particles of the conductivity enhancer smaller.

The positions to measure the number of the particles of the conductivity enhancer, similarly as the measurement of the above agglomerations, are set at four in total of two on the surface and two on the section of the sintered body. The number of the particles of the conductivity enhancer is preferably obtained by averaging these measurements. In measuring, an enlarged photograph corresponding to unit area 50×50 μm is taken for each position to be measured, the number of the conductivity enhancer is measured on the basis of the above method. For the enlarged photograph, though not particularly restricted, electron micrograph, XDS and EPMA are generally used. By implementing the color mapping, the particles of the conductivity enhancer may be discerned with ease.

When the number of the conductivity enhancer is four or less on the arbitrary straight-line distance 30 μm in the silicon nitride sintered body, the followings are considered. That is, (1) the particles of the conductivity enhancer are less contained, and (2) the maximum diameter of one particle of the conductivity enhancer is extremely large. When the content is less (1), the electrical resistivity of the silicon nitride sintered body does not so much go down, the effect of the addition of the particles of the conductivity enhancer is not sufficiently obtained. Furthermore, as to the case (2), as the case where the number of the particles of the conductivity enhancer in the straight-line distance 30 μm becomes four or less, for instance, a shape containing the particle of the conductivity enhancer of which size is 7.5 μm or more is considered. In such cases, an amount of the particles of the conductivity enhancer in the silicon nitride sintered body becomes substantially too much, resulting in the deterioration of the characteristics such as the strength or the wear resistance intrinsic to the silicon nitride sintered body.

On the other hand, in the case where the number of the particles of the conductivity enhancer in the arbitrary straight-line distance 30 μm in the silicon nitride sintered body exceeds 20 pieces, the following is considered. That is, (3) there are many extremely small particles, and (4) almost all component constituting the sintered body is the particle of the conductivity enhancer. In the case (3), for instance, when processing into the bearing balls, or when using as the bearing balls after the processing, the particles of the conductivity enhancer tend to fall off the sintered body. When the falling-off happens, pores tend to occur there or cracks tend to occur therefrom. As a result, cracks or chips are caused, resulting in a shorter life of the bearing ball. In the case (4), the state substantially the same with the case (2) is caused, the characteristics intrinsic to the silicon nitride sintered body being not utilized.

Taking into consideration making use of the characteristics intrinsic to the silicon nitride sintered body, a state where there are many particles of the conductivity enhancer in the silicon nitride sintered body is not preferable. From these circumstances, the particles of the conductivity enhancer are preferable to be in the range from 3 to 30% to the arbitrary straight-line distance 30 μm in the silicon nitride sintered body. In other words, it is preferable for the particles of the conductivity enhancer to occupy from 3 to 30% of the straight-line distance 30 μm. Together with the above number of the particles of the conductivity enhancer, by maintaining such state, the characteristics intrinsic to the silicon nitride sintered body may be suppressed from deteriorating.

The present wear resistant member for electronic equipment is preferable for the particles of the conductivity enhancer to be partially on the surface of the bearing ball or the like. That the particles are on the surface means that the particles of the conductivity enhancer are present on the sliding surface of the bearing ball, the particles of the conductivity enhancer being exposed on the surface. Thus, by partially exposing the particles of the conductivity enhancer on the surface of the bearing ball, the above malfunction due to the static electricity may be effectively cancelled.

Figure 2:
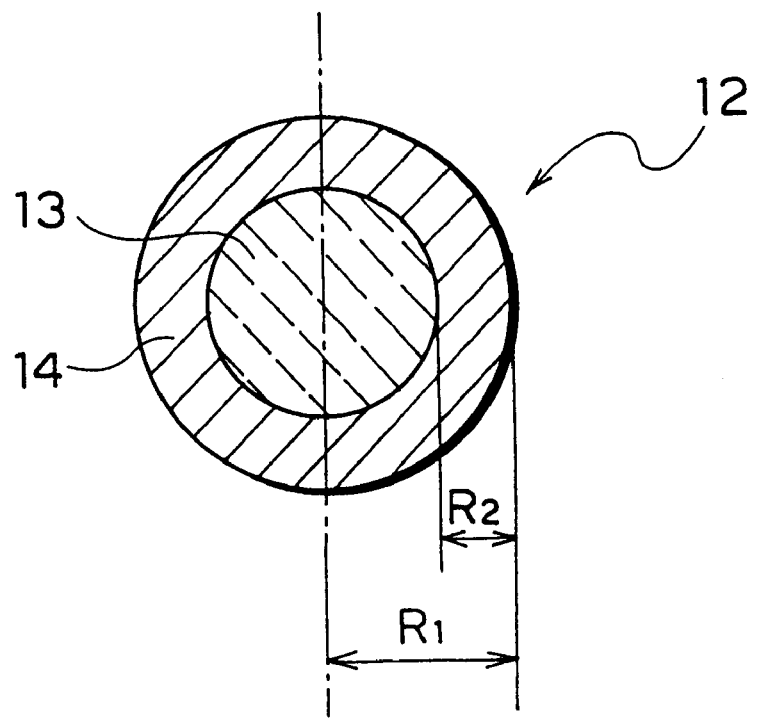
FIG. 2 is a sectional view showing a configuration of a bearing ball according to a second embodiment of the present invention.

The particles of the conductivity enhancer may be dispersed in an entire silicon nitride sintered body. However, by dispersing only in the surface layer thereof, the malfunction due to the static electricity may be more effectively cancelled and characteristics intrinsic to the silicon nitride sintered body may be more excellently maintained. FIG. 1 shows a configuration of the bearing ball 12 made of the silicon nitride sintered body 11 in the whole of which the particles of the conductivity enhancer are dispersed. On the other hand, FIG. 2 shows a configuration of the bearing ball 12 that comprises an inner layer 13 and a surface layer 14. The inner layer 13 is made of the sintered body of silicon nitride only. In the surface layer 14, the particles of the conductivity enhancer (part thereof forms agglomerations) are dispersed in the silicon nitride sintered body.

The bearing ball 12 shown in FIG. 2 comprises the surface layer 14 of which electrical resistivity is lower than that of the inner layer 13. The amount to be compounded and the state of dispersion of the particles of the conductivity enhancer in the surface layer are as mentioned above. A thickness $R_2$ of such surface layer 14 is preferably set in the range up to one third a radius $R_1$ of the bearing ball 12 from the surface thereof. That is, it is preferable to satisfy $\frac{1}{3} R_1 \geq R_2$. When the surface layer 14 that contains the particles of the conductivity enhancer exceeds $\frac{1}{3}$ the radius $R_1$, two-layered structure of the surface layer 14 and the inner layer 13 may decrease in its effect.

The static electricity may be suppressed from building-up by endowing electrical conductive properties (portion low in the electrical resistivity) only in the surface of the bearing ball 12. Accordingly, by containing the particles of the conductivity enhancer only in the surface layer 14, an amount to use the particles of the conductivity enhancer can be reduced in comparison with the case when the particles of the conductivity enhancer are contained throughout the bearing ball. This not only contributes in reducing manufacturing cost of the bearing ball 12 but also brings about an effect of making lighter in weight. In the bearings rotating with a high speed of 4,000 rpm or more for instance, even a slightly lighter weight of the bearing ball 12, a large effect may be obtained. An effect of manufacturing cost reduction accompanying the reduction in the amount of the particles of the conductivity enhancer is particularly effective in small bearing balls 12 of which diameter is 3 mm or less.

In addition, the inner layer 13, not containing the particles of the conductivity enhancer, maintains the characteristics intrinsic to the silicon nitride sintered body. Accordingly, the characteristics such as the hardness, wear resistance and fracture toughness as the bearing ball 12 are made closer to those intrinsic to the silicon nitride sintered body. As a result, by the use of such bearing balls 12, reliability of high-speed rotation (4,000 rpm or more for instance) in the rotating actuator of electronic equipment or the like for instance may be furthermore heightened.

The thickness $R_2$ of the surface layer 14 is further preferable to be 10 μm or more. When the thickness of the surface layer 14 is less than 10 μm, the particles of the conductivity enhancer in the surface layer 14 are fixed with difficulty. As a result, when sliding as the bearing ball 12, the particles of the conductivity enhancer tend to fall off. When the falling-off occurs, fracture starts therefrom to deteriorate the life of the bearing ball 12. Accordingly, the thickness $R_2$ of the surface layer 14 that contains the particles of the conductivity enhancer is preferable to be in the range of 10 μm or more and $\frac{1}{3}$ or less the radius $R_1$.

When the rolling element of the bearing has a shape of cylinder or the like other than the sphere, with a minimum radius as a reference distance, the range of $\frac{1}{3}$ from the surface or the range of 10 μm or more from the surface is derived. That is, the present silicon nitride sintered body can be used as the bearing member of various shapes. At such juncture, with a distance from a surface to a center in a thickness direction of the bearing member as a reference distance, the surface layer 14 is preferably formed in the range up to $\frac{1}{3}$ from the surface with respect to the distance. Furthermore, the surface layer 14 is preferably formed in the range of 10 μm or more from the surface with respect to the thickness direction of the bearing member.

In the bearing ball 12 of two-layered structure in which the present wear resistant member is applied, the surface layer 14 is preferably formed so that a ratio of a maximum thickness $W_1$ of the surface layer 14 to a minimum thickness $W_2$ thereof becomes $W_1/W_2 \leq 1.2$. In the bearing ball 12 having substantial two-layered structure of the surface layer 14 and the inner layer 13, the dispersion of the thickness of the surface layer 14 causes dispersion in the rolling fatigue life. That is, when the bearing ball 12 is slid, strain due to stress occurs where the thickness of the surface layer 14 is small, the peeling being likely to start therefrom. Accordingly, it is preferable to reduce the dispersion of the thickness of the surface layer 14.

The silicon nitride sintered body that is applied in the present wear resistant member for electronic equipment, except for compounding the particles of the conductivity enhancer, similarly with the general silicon nitride sintered body, may contain various kinds of metal compounds as the sintered additive. A composition ratio of the silicon nitride sintered body excluding the particles of the conductivity enhancer is not particularly restricted. However, taking into consideration the sliding properties or the like, the silicon nitride sintered body having the composition shown in the following is preferably used.

That is, in the present wear resistant member for electronic equipment, the silicon nitride sintered body comprising, with respect to 100 part by mass of silicon nitride, from 5 to 15 part by mass of at least one kind selected from oxides and nitrides of 3A group elements, from 0.5 to 3 part by mass of at least one kind selected from oxides and nitrides of 2A group elements and 4A group elements, and from 15 to 40 part by mass of at least one kind selected from carbides of 4A group elements, 5A group elements, 6A group elements, 7A group elements, silicon and boron, is preferably used.

As the oxides and nitrides of the 3A group elements, oxides and nitrides of rare earth elements such as yttrium (Y) or the like can be cited. Compounds of rare earth elements that become oxides or nitrides during the sintering may be used as starting material. The compounds such as oxides of 3A group elements form a grain boundary phase. In the silicon nitride sintered body, by the action of the grain boundary phase containing the compounds of the oxides of the 3A group elements or the like, grains of silicon nitride are solidly bonded, thereby the silicon nitride sintered body of higher strength being configured.

When the oxide or nitride of the 3A group elements is contained less than 5 part by mass, the grain boundary phase is deficiently formed, as a result sufficient strength may not be obtained. On the other hand, when the content of these compounds exceeds 15 part by mass, the grain boundary phase is formed unnecessarily excessively, the mechanical strength and thermal conductivity may be deteriorated. From these circumstances, the content of the oxide or nitride of the 3A group elements is preferable to be 3 part by mass or more and 15 part by mass or less, being more preferable to be 4 part by mass or more and 7 part by mass or less.

Furthermore, in order to strengthen the binding force between the grains of silicon nitride due to the grain boundary phase, an aluminum compound such as aluminum nitride or aluminum oxide is effectively compounded in the range of two part by mass or more and 10 part by mass or less. The addition of the aluminum compound forms a compound phase containing Al in the grain boundary phase, thereby the binding force between the grains of silicon nitride due to the grain boundary phase being furthermore strengthened. The aluminum compound may be added by one kind or by two kinds or more compositely.

The oxides and nitrides of 2A group elements or 4A group elements are components contributing in an improvement of sintering properties, being preferably contained in the range of 0.5 part by mass or more and 3 part by mass or less. These compounds of 2A group elements or 4A group elements may be singly added or both compounds of 2A and 4A group elements may be added together. As the 2A group elements, magnesium or calcium can be cited as the preferable one. As the 4A group elements, titanium, zirconium and hafnium can be cited as the preferable one. The compounds of these elements may be added as the oxide or nitride, instead may be compounds that become the oxide or nitride during the sintering.

The above carbides of various kinds of metals work as the particles of the conductivity enhancer, being preferably contained in the range of 15 part by mass or more and 40 part by mass or less. When the content of the metal carbide is less than 15 part by mass, the electrical resistivity of the silicon nitride sintered body may not be sufficiently lowered. On the other hand, when the content of the metal carbide exceeds 40 part by mass, the electrical resistivity itself of the silicon nitride sintered body may be lowered, but the characteristics intrinsic to the silicon nitride sintered body may be deteriorated.

In the present invention, as mentioned above, various kinds of conductive metal carbides can be used. These metal carbides work in suppressing grains of silicon nitride from growing, as a result not only showing an effect of lowering the dispersion of the electrical resistivity, but also acting effectively in improving the strength. Silicon carbide is particularly excellent in an effect of suppressing grain growth, being preferable one as the metal carbide used in the present invention.

The silicon nitride sintered body containing the metal carbide as mentioned above may provide a microcrystalline structure in which grains of silicon nitride of which longer diameter is 4 $\mu$m or less are present 90% or more with respect to total grains of silicon nitride. Furthermore, grains of silicon nitride of which short diameter is 1 $\mu$m or less are preferably contained by 90% or more with respect to total grains of silicon nitride. The silicon nitride sintered body comprising such microcrystalline structure has strength of 650 MPa or more in three point bending strength. Furthermore, in the bearing ball using such silicon nitride sintered body, crushing strength may be $1\times10^4$ MPa or more.

When carbide is contained in the sintered body so that the electrical resistivity of the silicon nitride sintered body is a prescribed value, the carbide is substantially present in the grain boundary phase. At this time, if a longer diameter or a shorter diameter of the grains of silicon nitride is too large, a distance between particles of carbide present in the grain boundary phase may become larger, the electrical resistivity being likely to fluctuate. That is, between the silicon nitride sintered bodies of the same composition, due to the difference of the sizes of the grains of silicon nitride, there may occur the difference of the electrical resistivity.

In the grains of silicon nitride forming the silicon nitride sintered body, aspect ratios (longer diameter/shorter diameter) ordinarily spread from approximately 1.2 to over 10. The silicon nitride sintered body comprises substantially anisotropically such grains different in the aspect ratio, the grain boundary phase being present between such grains of silicon nitride. In such silicon nitride sintered body, by materializing the microcrystalline structure as mentioned above, the electrical resistivity can be further suppressed from fluctuating. In particular, by incorporating the particles of silicon carbide of which maximum diameter is 1 $\mu$m or less, except for part of the particles of silicon carbide that forms the agglomerated particles, the particles of silicon carbide can be approximately uniformly dispersed between the grains of silicon nitride.

Thus, by the use of the particles of the carbide such as silicon carbide as the particles of the conductivity enhancer, the silicon nitride sintered body formed of the grains of silicon nitride that are fine in both the longer and shorter diameters may be obtained. The silicon nitride sintered body having such microcrystalline structure, in addition to improving the three point bending strength to 1,000 MPa or more, may suppress the dispersion of the electrical resistivity of the silicon nitride sintered body per 100 pieces for instance within ±10%. Even in the grains of silicon nitride of which longer diameter exceeds 4 $\mu$m, the maximum longer diameter may be suppressed to 10 $\mu$m or less.

Furthermore, as to the shape of the grain boundary phase, the width thereof may be made such thin as 1 $\mu$m or less, furthermore as 0.5 $\mu$m or less. By making thinner the width of the grain boundary phase such thin as 1 $\mu$m or less, the electrical resistivity may be controlled with more ease due to the particles of carbide. The grain boundary phase is mainly formed of oxides or oxy-nitrides such as Si—R (rare earth element)—O system compound, Si—Al—R—O system compound, Si—Al—O system compound, Si—R—O—N system compound, Si—Al—R—O—N system compound and Si—Al—O—N system compound. These compounds forming the grain boundary phase are insulators of which electrical resistivity exceeds $10^5$ Ω·m. Accordingly, the grain boundary phase too thick in the width decreases the effect of the addition of the particles of carbide.

The width of the grain boundary phase of the present invention shows a distance between the grains each of silicon nitride and a distance between the grain of silicon nitride and the particle of carbide. Furthermore, the longer and shorter diameters of the grains of silicon nitride are measured from the enlarged photograph as mentioned above. The width of the grain boundary phase is obtained, in the enlarged photograph, based on the distance between the nearest particles of the distance between the grains each of silicon nitride, and the distance between the grain of silicon nitride and the particle of carbide. Specifically, one grain of silicon nitride is determined as a measuring object, a straight-line being extended from an arbitrary point of measurement vertically to the surface of the grain, thereby the distance up to reaching the grain of silicon nitride or the particle of carbide being obtained.

The present wear resistant members for electronic equipment are used as the rolling elements of the bearings mounted on the above various kinds of electronic equipment. The bearing balls configuring the present invention as mentioned above, in addition to endowing appropriate electrical conductive properties, may provide an improvement in lowering the dispersion of the electrical resistivity between a plurality of balls. Accordingly, when the bearing having such bearing balls is applied in the electronic equipment such as the HDDS, the static electricity generated due to the high-speed rotation may be excellently released. Thereby, the malfunction of the electronic equipment due to the static electricity may be cancelled with certainty. The improvement in lowering the dispersion of the electrical resistivity is particularly effective in the small bearing balls of which diameter is 3 mm or less.

That is, usually, approximately from 20 to 40 pieces of bearing balls are combined to form a bearing. When rotating such bearing at a rotation speed of approximately 4,000 rpm, the dispersion of the values of electrical resistivity does not cause much trouble. However, when rotating at 7,200 rpm or more, based on the dispersion of the values of electrical resistivity, the static electricity instantaneously concentrates on the bearing ball of which value of electrical resistivity is the highest, resulting in adversely affecting on the electrical equipment such as the HDDs.

In particular, the electronic equipment such as the HDDs is affected by the instantaneously built-up charge. Accordingly, the dispersion of the values of electrical resistivity is preferable to be smaller between the bearing balls as the rotation speed goes higher. As a result, by applying the present silicon nitride sintered body of which dispersion of the values of electrical resistivity is small in the bearing ball of a diameter 3 mm or less, further 2 mm or less, even at the high-speed rotation of for instance 7,200 rpm or more, the malfunction due to the static electricity may be excellently reduced.

In addition to the above, in the present silicon nitride sintered body, since the particles of carbide higher in thermal conductivity than silicon nitride are added as the particles of conductivity enhancer, the thermal conductivity of 40 W/m K or more may be obtained. In the electronic equipment, as obvious from a substrate for a semiconductor device, heat handling is a very important problem. Accordingly, even in the sliding member for the electronic equipment, heat dissipation property is important. In particular, by configuring the bearing balls used in the rotation actuator of the electronic equipment such as the HDDs from the silicon nitride sintered body excellent in the heat dissipation property of which thermal conductivity is 40 W/m K or more, the following effects may be obtained. That is, not only the above static electricity may be suppressed from building up, but also frictional heat accompanying the rotation drive may be effectively dissipated. That is, both in the suppression of the build-up of the static electricity and in the improvement of heat dissipation properties, effects may be obtained.

In the bearing member, since the rotating shaft or the ball receiver is frequently formed of metal member such as bearing steels or the like, there tend to occur problems of deformation due to heat during the sliding. In particular, in the electronic equipment, the rotation speed tends to be higher such as 7,200 rpm or more, further 10,000 rpm or more, the problems accompanying the heat dissipation properties tend to occur with more frequency than ever. Accordingly, the bearing balls made of the silicon nitride sintered body high in thermal conductivity are suitable for the electronic equipment, being particularly suitable for the bearing member of which rotating shaft and the ball receiver are made of metal member such as bearing steels or the like.

At this time, it is preferable for the diameter of the bearing ball to be 3 mm or less, further 2 mm or less. The thermal conductivity of the present silicon nitride sintered body is high as 40 W/m K or more but is inferior to that of the metal member forming the rotating shaft or the ball receiver. Accordingly, from the viewpoint of heat dissipation properties, the silicon nitride bearing ball becomes a thermal resistor, the diameter of the bearing ball being preferable to be smaller. The bearing ball of a diameter of 3 mm or less, further 2 mm or less may lower thermal resistance of the bearing.

Though a manufacturing method of the present wear resistant member for electrical equipment is not particularly restricted, it is preferable to manufacture in terms of the following method for instance.

First, silicon nitride powder, sintered additive powder and powder to be particles of conductivity enhancer are weighed by the respective prescribed amounts, these being mixed thoroughly. For the raw material powders each, taking into consideration the sliding properties, not whisker or fiber, but granular powder is used. Though the sizes of the respective raw material powders are not particularly restricted, the silicon nitride powder is preferable for the average particle diameter to be in the range from 0.2 to 3 $\mu$m, the sintered additive powder to be 2 $\mu$m or less, and the powder of the particles of conductivity enhancer to be 2 $\mu$m or less, further to be in the range from 0.3 to 1.2 $\mu$m. When the average particle diameter of the powder of the conductivity enhancer exceeds 2 $\mu$m, only a slight agglomeration may cause the maximum diameter to be over 10 $\mu$m. Furthermore, to control the maximum diameter of the above agglomeration with ease, it is preferable to employ the powder low in the dispersion of the average particle diameter, for instance the powder of which standard deviation of the particle diameters is 1.5 $\mu$m or less.

When mixing the raw material powders each, it is important to suppress for the particles of the conductivity enhancer to agglomerate excessively. When there occurs excessive agglomeration of the particles of the conductivity enhancer, part where the agglomerations of the particles of the conductivity enhancer exceed 30% by area ratio tends to occur, and the maximum diameter of the agglomerations of the particles of the conductivity enhancer tends to exceed 10 $\mu$m.

From the above circumstances, the following procedure or the like is preferably adopted. That is, the particles of the conductivity enhancer for forming the agglomerations are granulated in advance so that the maximum diameter of the agglomerations is 10 $\mu$m or less, further 5 $\mu$m or less. The granulated powder is added so that the agglomerations satisfy the prescribed area ratio, thereafter the particles of the conductivity enhancer that are not agglomerated are separately added, followed by mixing. When adding and mixing the particles of the conductivity enhancer, for suppressing the further formation of the agglomerations, for instance the following method is effectively applied.

First, in mixing the raw material powder for one lot, the raw material powders each are divided in two or more, preferably in from 3 to 5, thus obtained relatively small amounts each being mixed, followed by final mixing into one. If only one mixing can give mixed powder where there are no excessive agglomerations of the particles of the conductivity enhancer, there will be no particular problems. However, in that time, in order to obtain the homogeneously mixed powder less in the agglomerated particles, the mixing time will be excessively longer in many cases, productivity being not necessarily high. Furthermore, when a large amount of raw material powders are mixed at a time, the particles of the conductivity enhancer tend to agglomerate when manufacturing the silicon nitride sintered body. As a result, part where the area ratio of the agglomerations exceeds 30% may be caused, or the maximum diameter of the agglomerations may exceeds 10 $\mu$m.

As another method, the following method is cited. First, the silicon nitride powder and the sintered additive are mixed. When adding the powder of the conductivity enhancer in the mixed powder, the particles of the conductivity enhancer that are not allowed to form the agglomerations of the particles of the conductivity enhancer are divided into several portions to add. For instance, an amount to be added of the particles of the conductivity enhancer is divided into two or more, preferably into from 3 to 5, these being added in turn to mix. At this time, after the elapse of a prescribed time period (30 min or more is preferable) from the first addition, a second and so on additions are implemented in turn. By adding and mixing by small amounts of the particles of the conductivity enhancer, the particles of the conductivity enhancer may be suppressed from further agglomerating.

By uniformly mixing the raw material powder by means of the above method, the particles of the conductivity enhancer may be suppressed from excessively agglomerating. Accordingly, the area ratio of the agglomerations of the particles of the conductivity enhancer may be made 30% or less, and the maximum diameter of the agglomerations may be made 10 $\mu$m or less, further 5 $\mu$m or less. In particular, when manufacturing the small bearing balls of a diameter of 3 mm or less, further of 2 mm or less, it is important that the agglomerations of the particles of the conductivity enhancer are not excessively formed. This is because the smaller the bearing ball becomes, the more easily affected by the agglomerations. Furthermore, the above method may provide the dispersion smaller in the number of the particles of the conductivity enhancer present on an arbitrary straight-line distance 30 $\mu$m, the dispersion in one silicon nitride sintered body being made approximately within ±5 pieces for instance.

When mixing the above raw material powders each, iron from the respective raw material powders or introduced in the course of raw material processing is suppressed from excessively mingling. Accordingly, it is preferable that the iron contents in for instance the raw material powders each are managed, thereby suppressing the iron from excessively containing. When the iron content is less, a prescribed amount may be added. Furthermore, by implementing dry iron removal to the mixed powder of the respective raw material powders or granulated powder therefrom, the iron contained in the powder may be removed to be a preferable amount. For the iron removal, for instance, the powder is flowed in a gap formed between opposite magnet rotors a definite distance apart, a current and a voltage being applied so that a magnetic field in a space connecting opposite points becomes approximately from 10,000 to 30,000 G for instance, in the magnetic field the iron being removed. This process may be repeated. The iron removal due to the magnetic field is particularly effective in positively removing the iron of which maximum diameter is large.

When manufacturing the bearing balls of two-layered structure, the mixed powders that form the surface layer and the inner layer are prepared, respectively. For the mixed powder that forms the surface layer, one that contains the above conductivity enhancer powder is used. As to the mixing or the like of the conductivity enhancer powder, the above method may be preferably applied. For the mixed powder that forms the inner layer, one that does not contain the conductivity enhancer powder, that is a raw material mixture of an ordinary silicon nitride sintered body is used.

The mixed powder of raw materials as mentioned above, after granulating as needs arise, is molded into a desired shape (into ball for instance). As to the molding method, ordinary molding methods can be applied. For instance, when manufacturing the bearing balls, the cold isostatic pressing (CIP) is preferably applied to manufacture molded bodies. In particular, it is preferable to apply consecutively the CIP process two or more times, thereby enabling to make mechanical strength higher.

When manufacturing the bearing balls of two-layered structure, it is preferable that on the mixed powder that forms the surface layer, the molded body that forms the inner layer is put on, thereafter rolling granulation being implemented. In the rolling granulation, while rolling the molded body forming the inner layer, the mixed powder forming the surface layer is stuck to form the molded body, the molded body having the surface layer of uniform thickness being obtained with reproducibility. A prescribed amount of mixed powder that forms the surface layer is laid down in a mold, thereafter the molded body that forms the inner layer being put in, followed by press-molding. Though the bearing ball of two-layered structure can be manufactured thus, such process tends to cause the surface layer to fluctuate in thickness.

Next, to the molded body after the rolling granulation having the surface layer and the inner layer, the CIP is applied. The CIP, as mentioned above, is preferable to apply consecutively two or more times. If the CIP is applied also in manufacturing the molded body that forms the inner layer, it will be essentially the same as the CIP is implemented two or more times. Of course, the CIP may be consecutively implemented two or more times to the molded body of two-layered structure after the rolling granulation. When applying the CIP two times, pores or the like in the molded body are suppressed from forming. Accordingly, the implementation of the CIP two or more times may provide the bearing balls excellent in characteristics.

By sintering the molded body obtained by the above method, the present wear resistant member for electronic equipment may be obtained. As to the sintering method, atmospheric pressure sintering, pressure sintering, hot isostatic pressing (HIP) or the like are applicable. When manufacturing the bearing balls, it is preferable to apply two-step sintering where after the atmospheric pressure sintering or the pressure sintering, the HIP is applied. Thereby, the pores formed during the sintering may be closed by means of the HIP. Accordingly, the sliding properties as the bearing ball are improved and the particles of the conductivity enhancer present in the surface may be more solidly adhered. After undergoing such sintering process, when using as the bearing balls, surface polishing is implemented to obtain the surface roughness stipulated by JIS.

The present wear resistant member for electronic equipment may be suitably used as the bearing ball or the like in rotation actuators of various kinds of electronic equipment. The present invention is particularly effective in the small bearing balls of which diameter is 3 mm or less. The bearing balls are generally formed in sphere, but are not necessarily restricted thereto. The silicon nitride sintered body due to the present invention may be applied in rolling elements of various shapes such as cylinder or bar for instance. Thus, the present invention is applicable in the various kinds of bearing such as the ball bearing, roller bearing and dynamic pressure bearing.

As the electronic equipment therein the present wear resistant member for electronic equipment is applicable, the magnetic recorders such as the HDDs or FDDs, the optical disk drives such as the CD-ROMs or the DVDs and various kinds of game machines can be cited. The optical disk drives include various optical recorders such as magneto-optical recorders, phase transition type magneto-optical recorders and playback-only optical disk drives. Furthermore, other than these, in whatever electronic equipment that has the rotation actuator, the present invention can be applied.

Figure 3:
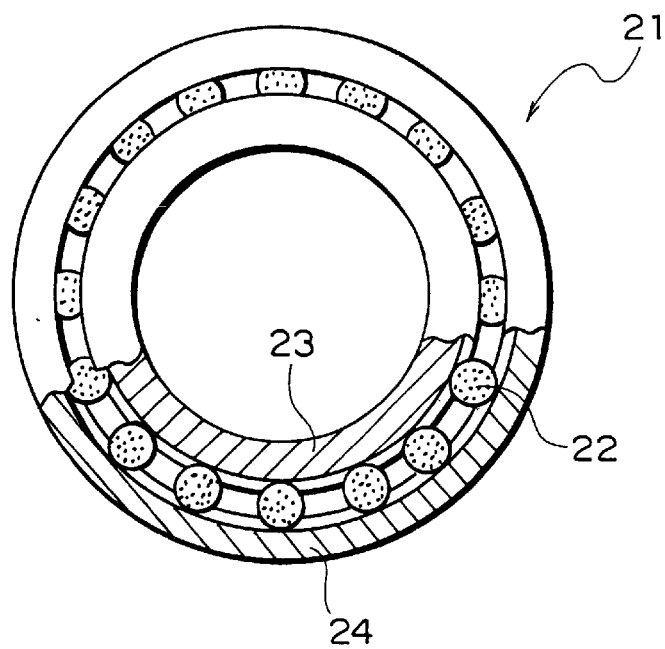
FIG. 3 is a diagram showing by a partial section of a rough configuration of a bearing according to one embodiment of the present invention.

The present bearing comprises a rolling element formed of the above wear resistant member for electronic equipment of the present invention, such as for instance the bearing balls. FIG. 3 is a diagram showing a configuration of one implementation mode of the present bearing. The bearing 21 shown in FIG. 3 comprises a plurality of bearing balls 22 made of the wear resistant member for electronic equipment of the present invention and inner 23 and outer 24 rings supporting these bearing balls 22. The inner 23 and outer 24 rings are preferably formed of bearing steels such as SUJ2 provided by JIS-G-4805, thereby high-speed rotation being realized with reliability. A fundamental configuration is the same as an ordinary bearing.

The above bearing 21 is used in the rotation actuators of various kinds of disks in the electronic equipment such as magnetic recorders such as the HDDs or FDDs, the optical disk drives such as the CD-ROMs or the DVDs and various kinds of game machines. Specifically, it is used in the rotation actuator of the spindle motor that rotates at high speeds a disk-like recording medium.

Figure 4:
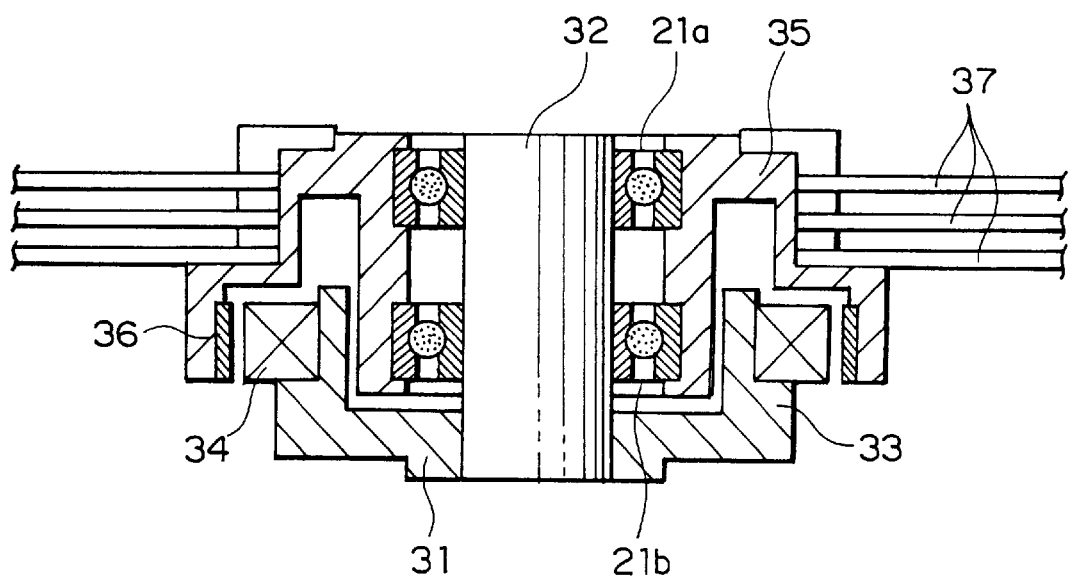
FIG. 4 is a sectional view showing a rough configuration of a spindle motor according to one embodiment of the present invention.

FIG. 4 is a diagram showing a configuration of a spindle motor according to one implementation mode of the present invention. On a pedestal 31 of motor, a fixed shaft 32 is erected, to the fixed shaft 32 a pair of above and below bearings 21a and 21b being attached. The configuration of the bearings 21a and 21b is as mentioned above. To the pedestal 31 of motor, a stator 33 is integrally fixed, the stator 33 comprising a coil 34.

To the fixed shaft 32, through the bearings 21a and 21b a hub 35 is attached rotatably. The hub 35 configures a rotor, at a position facing the coil 34 with a prescribed gap a rotor magnet 36 being disposed. To the hub 35, a disk 37 that is a body to be rotated is mounted.

Such spindle motor may realize a reliable high-speed rotation based on the configuration of the bearings 21a and 21b. Furthermore, even when the disk 37 is rotated at high speeds, the static electricity generated due to the high-speed rotation may be released outside through the inner 23 and outer 24 rings and the fixed shaft 32. The present spindle motor may be suitably applied in the electronic equipment such as the magnetic recorders such as the HDDs or FDDs, the optical disk drives such as the CD-ROMs or the DVDs and various kinds of game machines.

In the following, specific embodiments of the present invention and evaluation results thereof will be explained. Embodiments 1 through 4, Comparative Examples 1 and 2, and Reference Example 1

First, silicon nitride powder of an average particle diameter 0.7 $\mu$m, silicon carbide powder of an average particle diameter 0.7 $\mu$m or less (standard deviation is 1.3 $\mu$m or less) as the particles of the conductivity enhancer, and yttrium oxide powder of an average particle diameter 0.8 $\mu$m and aluminum oxide powder of an average particle diameter 0.9 $\mu$m both as the sintered additive are prepared, respectively. The composition ratios thereof are, with respect to the silicon nitride powder, 20% by mass for the silicon carbide powder, 5% by mass for the yttrium oxide powder and 4% by mass for the aluminum oxide.

For the silicon carbide powder, powder for forming the agglomerations between the particles of the conductivity enhancer is granulated in advance so that the maximum diameter of the agglomerations is 2 $\mu$m or less. The ratios of the granulated powder are adjusted according to the area ratios of the agglomerations shown in Table 1. In the mixing of the respective powders, first raw material powders each are divided into three, followed by mixing to obtain three mixed powders. Then, by mixing together the three mixed powders, mixed raw material powders containing prescribed contents of agglomerations of the particles of the conductivity enhancer are prepared, respectively.

The above mixed raw material powders each are molded by means of the CIP, followed by atmospheric pressure sintering at a temperature from 1600 to 1900° C. in an inert atmosphere, furthermore followed by the HIP sintering at a temperature from 1600 to 1900° C. Thus, a plurality of silicon nitride sintered bodies is prepared. In each embodiment, prismatic samples of 3×4×10 mm are prepared, and furthermore thereto surface polishing being implemented to an extent corresponding to grade 3 of a bearing ball qualified by JIS.

Furthermore, for comparison purpose with the present invention, similarly as the Embodiments except for adding an excessive amount of the particles of the conductivity enhancer at a time, a silicon nitride sintered body in which the area ratio of the agglomerations is outside the range of the present invention (Comparative Example 1) is prepared. In addition, similarly as the Embodiments except for the particles of the conductivity enhancer being not added, a silicon nitride sintered body (Comparative Example 2) is prepared. The Reference Example 1 is a silicon nitride sintered body where the agglomerations of the particles of the conductivity enhancer are slight.

The area ratio of the agglomerations, electrical resistivity, dispersion of the electrical resistivity, three-point bending strength (at room temperature) and thermal conductivity are measured for each of the silicon nitride sintered bodies due to the above Embodiments 1 through 4. Comparative Examples 1 and 2 and Reference Example 1. Results are shown in Table 1. All distances between the particles of the conductivity enhancer that do not form the agglomeration is within the range from 1 to 15 $\mu$m, the distances between the agglomerations being in the range from 2 to 10 $\mu$m.

The area ratio of the agglomerations of the particles of the conductivity enhancer is measured in the following ways for each of the silicon nitride sintered bodies. That is, each sample is polished so that surface roughness Ra is 0.01 $\mu$m or less, arbitrary four places (arbitrary area corresponding to unit area 30×30 $\mu$m) being selected on a polished surface as measuring places, the color map (magnification of 2,000 times) due to the EPMA of each measuring place being used to measure the area ratio. For the measurement of the electrical resistivity, top and bottom surfaces of each sample are lapped, electrodes being disposed on the top and bottom surface each, at room temperature resistance therebetween being measured by means of an insulating-resistance tester. The thermal conductivity, with each sample that is additionally machined into 3×3×10 mm, is measured by means of laser flash method. Each measurement is carried out with 100 samples, the measurements being averaged. For the dispersion of values of the electrical resistivity, a ratio of the difference between the largest electrical resistivity and the average value to the average value is shown as percent.

In measuring characteristics each, the sample is conveniently formed into a prismatic shape. However, even when measuring the respective characteristics of a spherical bearing ball for instance, similar lapping enables to measure.

TABLE 1

| | Area ratio of agglomerations of particles of conductivity enhancer (%) | Electrical resistivity ($\Omega \cdot m$) | Dispersion of electrical resistivity (%) | Three point bending strength (MPa) | Thermal conductivity (W/m K) |
|---|---|---|---|---|---|
| E1 | 2 | $5.3 \times 10^4$ | 10 | 1150 | 43 |
| E2 | 10 | $5.1 \times 10^4$ | 8 | 1100 | 45 |
| E3 | 20 | $5.0 \times 10^4$ | 8 | 1070 | 46 |
| E4 | 30 | $4.8 \times 10^4$ | 6 | 1010 | 46 |
| CE1 | 40 | $4.5 \times 10^4$ | 5 | 920 | 48 |
| CE2 | — | $\geq 10^8$ | — | 1200 | 24 |
| RE1 | 1 | $5.7 \times 10^4$ | 20 | 1170 | 43 |

E1 = Embodiment 1, E2 = Embodiment 2, E3 = Embodiment 3, E4 = Embodiment 4, CE1 = Comparative Example 1, CE2 = Comparative Example 2, RE1 = Reference Example 1

It is obvious from Table 1 that the present silicon nitride sintered bodies, in the range of the electrical resistivity from 1 to $10^5$ $\Omega \cdot m$, the three-point bending strength is 1000 MPa or more and the thermal conductivity is 40 W/m K or more. When applying the silicon nitride sintered body having characteristics such as the above electrical resistivity or the like in the bearing balls for electronic equipment such as the HDDs or the like described below, the malfunction due to the static electricity may be cancelled.

Contrary to the above, in Comparative Example 1, due to the high ratio of the agglomerations of the particles of the conductivity enhancer, while the dispersion of the electrical resistivity is smaller, mechanical strength of the sintered body is lower. On the other hand, in Comparative Example 2 where the particles of the conductivity enhancer are not added, the electrical resistivity is $10^8$ $\Omega \cdot m$ or more, and the thermal conductivity is low. In the silicon nitride sintered body of Reference Example 1, due to the area ratio of the agglomerations of the particles of the conductivity enhancer of 1%, though the electrical resistivity itself is in the range from 1 to $10^5$ $\Omega \cdot m$, the dispersion thereof is larger.

The maximum diameters of the agglomerations of the particles of the conductivity enhancer are 3 $\mu$m or less in all silicon nitride sintered bodies due to Embodiments 1 through 4. On the other hand, in the silicon nitride sintered body due to Comparative Example 1 where the particles of the conductivity enhancer are excessively added at a time, there is a plurality of places where the maximum diameter of the agglomeration is 20 $\mu$m or more. It is considered that this causes deterioration of the mechanical strength.

Embodiments 5 through 8, Comparative Examples 3 through 5, and Reference Example 2

According to the similar manufacturing process as the above Embodiment 1, a plurality of bearing balls of a diameter 2 mm is prepared from silicon nitride sintered bodies in which the electrical resistivity and the ratio of the agglomerations of the particles of the conductivity enhancer are altered. A surface of each bearing ball is polished to the surface roughness corresponding to grade 3.

In addition, for comparison purpose with the present invention, bearing balls of which area ratio of the agglomerations of the particles of the conductivity enhancer is outside the range of the present invention (Comparative Example 3), bearing balls that do not contain the particles of the conductivity enhancer (Comparative Example 4), bearing balls of which electrical resistivity is lower than the range of the present invention (Comparative Example 5) and bearing balls in which the agglomerations of the particles of the conductivity enhancer are slight (Reference Example 2) are prepared, respectively.

Next, with 10 pieces of the respective bearing balls as one set, the bearings are prepared, respectively. Bearing steel SUJ2 is used for other bearing members such as the ball receiver or the like. The bearings each are assembled in the spindle motors, respectively, to use as the HDD motors. These spindle motors are operated continuously for 200 hr at the rotation speeds of 7,200 rpm and 11,000 rpm, respectively, to check whether there is malfunction due to the static electricity at that time or not. The malfunction due to the static electricity is measured for 100 sets of HDDs, respectively.

Next, the rolling fatigue life is measured of each bearing ball. The maximum diameters of the agglomerations of the particles of the conductivity enhancer are 5 $\mu$m or less for all bearing balls due to the respective Embodiments. The maximum diameter of the agglomerations of the bearing ball due to Comparative Example 3 is 9 $\mu$m, that of the bearing ball due to Comparative Example 5 being 23 $\mu$m. The rolling fatigue life, with a thrust type bearing test machine, is measured by rolling the bearing ball against a plane table (counterpart) made of SUJ2 steel. The bearing ball is rotated under the conditions of the maximum contact stress a ball of 5.9 GPa, the number of rotation of 1,200 rpm and oil-bath lubrication of turbine oil for 400 hr at the maximum. The rolling fatigue life is evaluated by the time when the surface of the ball peels. The results are shown together in Table 2.

TABLE 2

| | Electrical resistivity ($\Omega \cdot m$) | Area ratio of agglomerations of particles of conductivity enhancer (%) | Dispersion of electrical resistivity (%) | Malfunction due to static electricity (at 7,200 rpm) | Malfunction due to static electricity (at 11,000 rpm) | Rolling fatigue life of bearing ball (h) |
|---|---|---|---|---|---|---|
| E5 | 3 | 2 to 10 | ±3 to 8 | none | none | $\geq 400$ |
| E6 | $7 \times 10^2$ | 2 to 10 | ±3 to 8 | none | none | $\geq 400$ |
| E7 | $5 \times 10^3$ | 2 to 10 | ±3 to 8 | none | none | $\geq 400$ |
| E8 | $8 \times 10^4$ | 2 to 10 | ±3 to 8 | none | none | $\geq 400$ |
| CE3 | $5 \times 10^3$ | 40 to 50 | ±2 to 6 | none | none | 220 |
| CE4 | $\geq 10^8$ | no addition | — | yes | yes | $\geq 400$ |
| CE5 | $2 \times 10^{13}$ | 30 to 60 | ±20 to 35 | none | none | 100 |
| RE2 | $5 \times 10^3$ | 0.1 to 1 | ±15 to 30 | none | slightly | — |

E5 = Embodiment 5, E6 = Embodiment 6, E7 = Embodiment 7, E8 = Embodiment 8, CE3 = Comparative Example 3, CE4 = Comparative Example 4, CE5 = Comparative Example 5, RE2 = Reference Example 2

It is obvious from Table 2 that by the use of the bearing balls each according to Embodiments 5 through 8, the malfunction due to the static electricity may be cancelled. It is furthermore found that the bearing balls each due to Embodiments 5 through 8, in addition to smaller dispersion of the electrical resistivity, show excellent rolling fatigue life identical as Comparative Example 5 therein no particles of the conductivity enhancer are added.

Contrary to the above, in Comparative Example 4, due to high electrical resistivity, the malfunction due to the static electricity is caused (1 to 3 sets among 100 sets). In Comparative Examples 4 and 5, while the malfunction due to the static electricity is not caused, due to the lower mechanical strength of the bearing balls, the rolling fatigue life is short. That is, these are unfavorable for longer operation. This is considered due to too large ratio of the agglomerations and the larger maximum diameter of the agglomerations.

In the bearing ball of Reference Example 2, the malfunction due to the static electricity is not found at the rotation speed of approximately 7,200 rpm. However, at 11,000 rpm, though the HDD does not go to complete stop, the malfunction is slightly confirmed (1 to 2 sets among 100 sets). Accordingly, the malfunction due to the static electricity is shown as "slightly". This is considered because due to the larger dispersion of the electrical resistivity of the bearing ball, the static electricity concentrates instantaneously on the bearing ball of which electrical resistivity is the largest.

Embodiments 9 and 10, and Reference Example 3

In order to study an influence due to the maximum diameter of the agglomerations of the particles of the conductivity enhancer, similarly with Embodiment 7 except for the maximum diameter of the agglomerations being altered, a plurality of bearing balls is prepared, respectively. With the bearing balls each, the rolling fatigue life test is implemented similarly with Embodiment 5. Furthermore, the crushing strength and three-point bending strength (at room temperature) are also measured. In the measurement of the crushing strength, by means of a measuring method according to the former JIS B1501, compressive load is put on, by the load at destruction the crushing strength being measured. The results are shown in Table 3.

Figure 6:
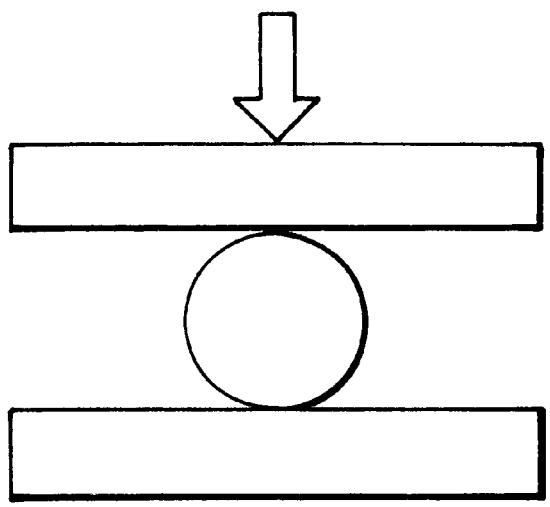
FIG. 6 is a diagram showing a measuring method of crushing strength of a bearing ball.

The present bearing ball, being small such as 3 mm in its diameter, is difficult to measure the crushing strength according to the above JIS method (two pieces of bearing balls are piled up vertically to measure). Accordingly, as shown in FIG. 6, one piece of the ball is placed between a pair of plane tables and load is put from the above until the ball is crushed, the load at crushing being taken as the crushing strength. For the plane table, quenched bearing steel (SUJ2) of which hardness is 60 HRC or more is employed. Loading speed is set at 3 mm/min. In the present measurement, since one piece of the ball is crushed, the crushing strength is larger than that according to the JIS method.

TABLE 3

| | Maximum diameter of agglomerations of particles of conductivity enhancer ($\mu$) | Rolling fatigue life (h) | Crushing strength (MPa) | Three-point bending strength (MPa) |
|---|---|---|---|---|
| E9 | 1.6 | $\geq$400 | $2.2 \times 10^4$ | 1120 |
| E10 | 3 | $\geq$400 | $2.0 \times 10^4$ | 1090 |
| RE3 | 15 | 370 | $1.2 \times 10^4$ | 1020 |

E9 = Embodiment 9, E10 = Embodiment 10, RE3 = Reference Example 3

It is obvious from Table 3 that ones of which maximum diameter of the agglomerations of the particles of the conductivity enhancer is 10 $\mu$m or less (5 $\mu$m or less in particular) are excellent in the rolling fatigue life and the crushing strengths are also excellent such as $2 \times 10^4$ MPa or more. Contrary thereto, it is found that Reference Example 3 that is outside the present preferable range is slightly inferior in the mechanical strength. This is considered because due to the too large maximum diameter of the agglomerations of the particles of the conductivity enhancer, the agglomeration becomes the starting point of fracture.

Embodiments 11 through 20

Similarly as Embodiment 2 except for changing materials of the particles of the conductivity enhancer to materials shown in Table 4 respectively, silicon nitride sintered bodies are prepared. With the silicon nitride sintered bodies each, the measurements the same with Embodiment 2 are implemented. The results are shown together in Table 4.

TABLE 4

| | Materials of particles of conductivity enhancer | Electrical resistivity ($\Omega \cdot$ m) | Three-point bending strength (MPa) | Thermal conductivity (W/m K) |
|---|---|---|---|---|
| E11 | TiC | $3 \times 10^3$ | 1120 | 54 |
| E12 | Nbc | $3 \times 10^3$ | 1120 | 52 |
| E13 | HfC | $4 \times 10^3$ | 1150 | 55 |
| E14 | WC | $5 \times 10^3$ | 1140 | 50 |
| E15 | Mo$_2$C | $7 \times 10^3$ | 1100 | 48 |
| E16 | TaC | $5 \times 10^3$ | 1110 | 49 |
| E17 | Cr$_3$C$_2$ | $8 \times 10^3$ | 1090 | 47 |
| E18 | ZrC | $8 \times 10^3$ | 1100 | 50 |
| E19 | Mn$_3$C | $8 \times 10^3$ | 1080 | 46 |
| E20 | B$_4$C | $8 \times 10^3$ | 1080 | 55 |

E11 = Embodiment 11, E12 = Embodiment 12, E13 = Embodiment 13,
E14 = Embodiment 14, E15 = Embodiment 15, E16 = Embodiment 16,
E17 = Embodiment 17, E18 = Embodiment 18, E19 = Embodiment 19,
E20 = Embodiment 20

It is obvious from Table 4 that also in the case of the materials of the particles of the conductivity enhancer being changed, the present silicon nitride sintered bodies are excellent in all of the electrical resistivity, three-point bending strength and thermal conductivity. Furthermore, when the bearing balls are prepared from these silicon nitride sintered bodies each, it is confirmed that all bearing balls show excellent characteristics such as the crushing strengths of $2 \times 10^4$ MPa or more and the rolling fatigue lives of 400 h or more.

Embodiments 21 through 24, and Comparative Examples 6 through 8

Similarly as Embodiment 2 except for changing the number of the particles of the conductivity enhancer per straight-line distance 30 $\mu$m, silicon nitride sintered bodies are prepared. The area ratios of the agglomerations of the particles of the conductivity enhancer are approximately the same with Embodiment 2. In addition, with these silicon nitride sintered bodies each, the measurements the same as Embodiment 2 are carried out. The results are shown together in Table 5. In Comparative Example 6, the content of the particles of the conductivity enhancer is reduced; in Comparative Example 7, excessive particles of the conductivity enhancer are added at a time; in Comparative Example 8, the conductivity enhancer is not contained.

TABLE 5

| | Number of particles of conductivity enhance per straight-line distance 30 $\mu$m (piece) | Electrical resistivity ($\Omega \cdot$ m) | Three-point bending strength (MPa) | Thermal conductivity (W/m K) |
|---|---|---|---|---|
| E21 | 5 | $5 \times 10^4$ | 1150 | 43 |
| E22 | 10 | $6 \times 10^3$ | 1100 | 48 |
| E23 | 15 | $2 \times 10^2$ | 1070 | 52 |
| E24 | 20 | $7 \times 10$ | 1010 | 58 |
| CE6 | 1 | $\geq 10^8$ | 1180 | 27 |
| CE7 | 30 | $2 \times 10^{-1}$ | 920 | 65 |
| CE8 | 0 | $\geq 10^8$ | 1200 | 24 |

E21 = Embodiment 21, E22 = Embodiment 22, E23 = Embodiment 23, E24 = Embodiment 24, CE6 = Comparative Example 6, CE7 = Comparative Example 7, CE8 = Comparative Example 8

It is obvious from Table 5 that when the number of the particles of the conductivity enhancer per straight-line distance 30 μm is set from 5 to 20 pieces, the silicon nitride sintered bodies may be provided which have excellent electrical resistivity and are excellent in both the three-point bending strength and thermal conductivity. It is confirmed that all of the bearing balls made from these silicon nitride sintered bodies may cancel the malfunction due to the static electricity, and further show excellent rolling fatigue lives.

Embodiments 25 through 29, and Reference Examples 4 through 6

With the same composition as the above Embodiment 22, the bearing balls (diameter: 2 mm, surface roughness: grade 3) in which the number of the particles of the conductivity enhancer per straight-line distance 30 μm is from 8 to 13 are prepared. In preparing the bearing balls each, the maximum diameter of the particles of the conductivity enhancer (SiC) are altered in the range from 0.3 to 4 μm, thereby the ratio of the particles of the conductivity enhancer per straight-line distance 30 μm being altered.

Furthermore, as Reference Examples 4 through 6, with the particles of the conductivity enhancer of which maximum diameter is 0.3 to 4 μm, the bearing balls in which the ratio of the particles of the conductivity enhancer per straight-line distance 30 μm is set at 50% (Reference Example 4), the bearing balls in which the particles of the conductivity enhancer (SiC) having the maximum diameter of 10 μm are used (Reference Example 5) and the bearing balls in which the particles of the conductivity enhancer (SiC) having the maximum diameter of 0.05 μm or less are used (Reference Example 6) are prepared, respectively.

With the bearing balls each according to the above Embodiments 25 through 29 and Reference Examples 4 through 6, the crushing strength and the rolling fatigue life are measured similarly as Embodiment 9. The results are shown in Table 6.

TABLE 6

| | Number of particles of conductivity enhancer on a straight-line distance 30 μm (%) | Crushing strength (MPa) | Rolling fatigue life (h) |
|---|---|---|---|
| Embodiment 25 | 4 | 3.0 × 10$^4$ | ≧400 |
| Embodiment 26 | 10 | 2.8 × 10$^4$ | ≧4.0 |
| Embodiment 27 | 15 | 2.2 × 10$^4$ | ≧400 |
| Embodiment 28 | 20 | 1.7 × 10$^4$ | ≧400 |
| Embodiment 29 | 28 | 1.5 × 10$^4$ | ≧400 |
| RF4 | 50 | 7.0 × 10$^3$ | 200 |
| RF5 | 40 | 9.0 × 10$^3$ | 250 |
| RF6 | 1 | 3.2 × 10$^4$ | 350 |

RF4 = Reference Example 4, RF5 = Reference Example 5, RF6 = Reference Example 6

It is obvious from Table 6 that the bearing balls in which the ratios of the particles of the conductivity enhancer on a straight-line distance 30 μm are in the range from 3 to 30% show excellent crushing strength and rolling fatigue life.

Embodiments 30 through 33 and Reference Example 7

Similarly as Embodiment 2 except for altering the contents of the iron component, silicon nitride sintered bodies are prepared. The area ratios of the agglomerations of the particles of the conductivity enhancer are approximately equal with Embodiment 2. With these silicon nitride sintered bodies, the measurements similar as Embodiment 2 are implemented. The results are shown in Table 7. Reference Example 7 excessively contains the iron.

TABLE 7

| | Content of iron (ppm) | Electrical resistivity (Ω · m) | Dispersion of electrical resistivity (%) | Three point bending strength (MPa) | Thermal conductivity (W/m K) |
|---|---|---|---|---|---|
| E30 | 10 | 4.9 × 10$^4$ | 8 | 1150 | 46 |
| E31 | 60 | 4.7 × 10$^4$ | 6 | 1130 | 47 |
| E32 | 100 | 4.7 × 10$^4$ | 6 | 1110 | 48 |
| E33 | 170 | 4.5 × 10$^4$ | 5 | 1080 | 48 |
| RE7 | 800 | 4.3 × 10$^4$ | 5 | 930 | 50 |

E30 = Embodiment 30, E31 = Embodiment 31, E32 = Embodiment 32, E33 = Embodiment 33, RE7 = Reference Example 7

It is obvious from Table 7 that the silicon nitride sintered bodies containing appropriate amounts of iron are excellent in all of the electrical resistivity, three-point bending strength and thermal conductivity. In addition, it is confirmed that all of the bearing balls prepared from these silicon nitride sintered bodies may cancel the malfunction due to the static electricity and show excellent crushing strength and rolling fatigue life.

Embodiments 34 through 37 and Comparative Examples 9 through 11

With the respective raw material powders the same with the above Embodiment 1, except for compounding, with respect to 100 part by mass of silicon nitride powder, 5 part by mass of yttrium oxide powder, 4 part by mass of aluminum oxide powder and silicon carbide powders in the amounts shown in Table 8, similarly as Embodiment 1, the silicon nitride sintered bodies are prepared, respectively. The area ratios of the agglomerations of the particles of the conductivity enhancer are all in the range from 2 to 30%. With these silicon nitride sintered bodies, the measurements are carried out similarly as Embodiment 1. Furthermore, the ratios of silicon nitride grains of which longer diameter is 4 μm or less are measured. These results are shown in Table 8.

Comparative Example 9 is the silicon nitride sintered body that does not contain the particles of silicon carbide; Comparative Example 10 being the silicon nitride sintered body prepared by adding excessive silicon carbide powder at a time; Comparative Example 11 being one prepared by adding a small amount of silicon carbide at a time. With these silicon nitride sintered bodies of respective comparative examples, the measurements are also carried out similarly as embodiments. These results are shown together in Table 8.

Next, the bearing balls (diameter: 2 mm, surface roughness: grade 3) the same in compositions as the above silicon nitride sintered bodies each are prepared, respectively. With the bearings configured by the use of these bearing balls, similarly as Embodiment 5, the HDDs are checked whether the malfunction due to the static electricity occurs or not. In addition, similarly as Embodiment 9, the crushing strength is measured. These results are shown together in Table 8.

TABLE 8

| | Content of particles of silicon carbide (part by mass) | Electrical resistivity (Ω · m) | Ratio of silicon nitride grains having a diameter of 4 μm or less (%) | Three-point bending strength (MPa) | Thermal conductivity (W/m K) | Malfunction due to static electricity | Crushing strength (MPa) |
|---|---|---|---|---|---|---|---|
| E34 | 15 | $2 \times 10^4$ | 93 | 1160 | 41 | none | $3.0 \times 10^4$ |
| E35 | 20 | $3 \times 10^3$ | 95 | 1120 | 45 | none | $2.4 \times 10^4$ |
| E36 | 35 | $4 \times 10^2$ | 97 | 1080 | 54 | none | $1.6 \times 10^4$ |
| E37 | 40 | $6 \times 10^1$ | 99 | 1020 | 57 | none | $1.0 \times 10^4$ |
| CE9 | 0 | $\geq 10^{11}$ | 85 | 1200 | 24 | yes | $3.2 \times 10^4$ |
| CE10 | 70 | 30 | 95 | 600 | 70 | none | $6.0 \times 10^3$ |
| CE11 | 2 | $\geq 10^{11}$ | 86 | 1190 | 25 | yes | $3.2 \times 10^4$ |

E34 = Embodiment 34, E35 = Embodiment 35, E36 = Embodiment 36, E37 = Embodiment 37, CE9 = Comparative Example 9, CE10 = Comparative Example 10, CE11 = Comparative Example 11

It is obvious from Table 8 that the silicon nitride sintered bodies containing appropriate amounts of silicon carbide are excellent in all of the electrical resistivity, three-point bending strength and thermal conductivity. Furthermore, it is found that 90% or more of silicon nitride grains have the longer diameter of 4 μm or less. The silicon nitride grains of which longer diameter exceeds 4 μm all are 10 μm or less in the longer diameter. Furthermore, there are 90% or more of silicon nitride grains of which shorter diameter is 1 μm or less, the width of the grain boundary phase being 1 μm or less.

Embodiments 38 through 41

Except for the use of 3A group compounds, 2A and 4A group compounds and aluminum compounds shown in Table 9, similarly as Embodiment 35, the silicon nitride sintered bodies are prepared, respectively. The content of silicon carbide powder (the maximum diameter: 1 μm or less) is 20 part by mass. Of these silicon nitride sintered bodies each, the electrical resistivity, ratio of silicon nitride grains of which longer diameter is 4 μm or less, three-point bending strength and thermal conductivity are measured similarly as Embodiment 35. These results are shown in Table 9.

TABLE 9

| | Composition | | | Electrical resistivity (Ω · m) | Ratio of silicon nitride grains having a diameter of 4 μm or less (%) | Three-point bending strength (MPa) | Thermal conductivity (W/m K) |
|---|---|---|---|---|---|---|---|
| | *1 | *2 | *3 | | | | |
| E38 | $Y_2O_3$ (3) | $TiO_2$ (0.8) | $Al_2O_3$ (3) | $3.5 \times 10^4$ | 95 | 1100 | 42 |
| E39 | $Y_2O_3$ (3) | $TiO_2$ (2.0) | $Al_2O_3$ (3) AlN (2) | $3.8 \times 10^3$ | 94 | 1110 | 45 |
| E40 | $Y_2O_3$ (8) | CaO (1) | $Al_2O_3$ (5) | $3.6 \times 10^3$ | 90 | 1080 | 44 |
| E41 | $Y_2O_3$ (8) | $HfO_2$ (1) | $Al_2O_3$ (6) | $3.9 \times 10^3$ | 91 | 1060 | 43 |

E38 = Embodiment 38, E39 = Embodiment 39, E40 = Embodiment 40, E41 = Embodiment 41, *1 = 3A group compound (part by mass), *2 = 2A and 3A group compound (part by mass), *3 = Al compound (part by mass)

Embodiments 42 through 47 and Comparative Example 12

Silicon nitride powder of an average particle diameter of 0.6 μm, yttrium oxide powder of an average particle diameter of 1.2 μm and aluminum oxide powder of an average particle diameter of 0.6 μm both as the sintered additive, and silicon carbide powder of an average particle diameter of 0.5 μm as the particles of the conductivity enhancer are prepared, respectively. With these powders, a raw material powder mixture for the inner layer and a raw material powder mixture for the surface layer are prepared in the following ways, respectively.

For the raw material powder for the inner layer, the powder mixture containing 5 part by mass of yttrium oxide powder, 2 part by mass of aluminum oxide powder and a remainder of silicon nitride powder is prepared. For the raw material powder for the surface layer, a plurality of powder mixtures containing 5 part by mass of yttrium oxide powder, 2 part by mass of aluminum oxide powder, various compounding amounts of silicon carbide powders and a remainder of silicon nitride powder is prepared.

Next, the above raw material powder for inner layer is molded into sphere by means of the CIP. The spherically molded body for the inner layer is laid on the respective raw material powders for the surface layer, undergoing the rolling granulation to prepare the spherically molded body having surface and inner layers, respectively. The surface layer is formed up to ⅓ of a radius from the surface. These spherically molded bodies, after further CIP treatment, undergo atmospheric pressure sintering at a temperature of 1800° C., followed by the HIP sintering at a temperature of 1700° C. The bearing balls each are finished to a diameter of 2 mm, surface roughness being grade 3. In addition, all ratios of the maximum thicknesses $W_1$ to the minimum thicknesses $W_2$ ($W_1/W_2$) of the surface layers of the bearing balls each are 1.2 or less.

The electrical resistivity and fracture toughness of the bearing balls each are measured. The fracture toughness is measured in terms of IF method based on JIS-R-1607. These results are shown in Table 10. Next, the above bearing balls each and ball receivers made of bearing steel SUJ2 are combined to prepare the bearings as shown in FIG. 3, respectively. Each of these bearings is assembled in a spindle motor (cf. FIG. 4) to use as a motor for the HDD. These spindle motors are continuously rotated at a rotation speed of 7,200 rpm for 100 h to check the malfunction due to the static electricity. The malfunction due to the static electricity is confirmed by checking whether there is one or not that is damaged due to the static electricity. The measurements are together shown in Table 10.

Comparative Example 12 in the table denotes the bearing balls made of the silicon nitride sintered body that does not contain the particles of the conductivity enhancer (particles of silicon carbide). That is, the bearing balls are made of the above raw material mixture for inner layer alone.

TABLE 10

| | Content of particles of conductivity enhancer in surface layer (% vol.) | Electrical resistivity of surface layer (Ω·m) | Fracture toughness (MPa·m$^{0.5}$) | Malfunction due to static electricity or not |
|---|---|---|---|---|
| E42 | 28 | $1 \times 10^{-3}$ | 6.5 | none |
| E43 | 25 | $4 \times 10^{-1}$ | 6.6 | none |
| E44 | 21 | 3 | 6.2 | none |
| E45 | 18 | $4 \times 10$ | 6.4 | none |
| E46 | 17 | $6 \times 10^2$ | 6.5 | none |
| E47 | 15 | $7 \times 10^3$ | 6.4 | none |
| CE12 | — | $\geq 10^8$ | 6.5 | yes |

E42 = Embodiment 42, E43 = Embodiment 43, E44 = Embodiment 44, E45 = Embodiment 45, E46 = Embodiment 46, E47 = Embodiment 47, CE12 = Comparative Example 12

It is obvious from Table 10 that in the silicon nitride bearing balls that contain an appropriate amount of the particles of the conductivity enhancer in the surface layer, there is no malfunction due to the static electricity, the unnecessary build-up of the static electricity caused accompanying the high-speed rotation of the bearing being suppressed from occurring. As to the fracture toughness, it is found that values close to that of the silicon nitride bearing ball of Comparative Example 12 that does not contain the particles of the conductivity enhancer are maintained.

Embodiments 48 through 54

Similarly as Embodiment 44 except for changing the particles of the conductivity enhancer to be compounded in the surface layer to materials shown in Table 11, silicon nitride bearing balls are prepared. The electrical resistivity and fracture toughness are measured similarly as Embodiment 44 for each of these bearing balls. Furthermore, with the respective bearing balls, similarly as Embodiment 44, the bearings, spindle motors and HDDs are assembled. With these, the malfunction due to the static electricity is checked of the respective HDDs. The results are shown in Table 11.

TABLE 11

| | Material of particles of conductivity enhancer in surface layer | Electrical resistivity of surface layer (Ω·m) | Fracture toughness (MPa·m$^{0.5}$) | Malfunction due to static electricity or not |
|---|---|---|---|---|
| E48 | TiC | 1 | 6.3 | none |
| E49 | SiC | $3 \times 10^2$ | 6.2 | none |
| E50 | WC | $2 \times 10$ | 6.5 | none |
| E51 | TiN | 1 | 6.6 | none |
| E52 | TaC | $6 \times 10$ | 6.4 | none |
| E53 | HfC | 5 | 6.3 | none |
| E54 | ZrC | 9 | 6.2 | none |

E48 = Embodiment 48,, E49 = Embodiment 49, E50 = Embodiment 50, E51 = Embodiment 51, E52 = Embodiment 52, E53 = Embodiment 53, E54 = Embodiment 54

It is obvious from Table 11 that also in the case where the material of the conductivity enhancer being altered, the silicon nitride bearing balls having the surface layer containing the prescribed amounts of the particles of the conductivity enhancer all are confirmed to show excellent results.

As obvious from the above embodiments, the silicon nitride sintered bodies containing the agglomerations of the particles of the conductivity enhancer in the appropriate range have excellent properties as the wear resistant member for electronic equipment. That is, the wear resistant member for electronic equipment may be provided that while maintaining the characteristics intrinsic to silicon nitride sintered body, may cancel the malfunction due to the static electricity. Such wear resistant member for electronic equipment of the present invention is suitable for the bearing member used in the electronic equipment such as the HDDs or the like, enabling to materialize the reliable high-speed rotation or the like in the rotation actuators of the various kinds of electronic equipment.

While the invention has been described with reference to certain preferred embodiments, as will be apparent to those skilled in the art, certain changes and modifications can be made without departing from the scope of the invention as defined by the following claims.

What is claimed is:

1. Wear resistant member for electronic equipment, comprising:
   a silicon nitride sintered body containing conductivity enhancing particles and having an electrical resistivity in the range from 1 to $10^5$ Ω·m,
   wherein the silicon nitride sintered body comprises an agglomeration of the conductivity enhancing particles in which a distance between the conductivity enhancing particles is less than 1 μm, and the agglomeration of the conductivity enhancing particles is present in the range from 2 to 30% by area ratio per unit area in the silicon nitride sintered body.

2. The wear resistant member for electronic equipment as set forth in claim 1,
   wherein a distance between the agglomerations of the conductivity enhancing particles is in the range from 2 to 10 μm.

3. The wear resistant member for electronic equipment as set forth in claim 1,
   wherein a distance between the conductivity enhancing particles that do not form the agglomeration is in the range from 1 to 15 μm.

4. The wear resistant member for electronic equipment as set forth in claim 1,
   wherein a maximum diameter of the agglomeration of the conductivity enhancing particles is 10 μm or less.

5. The wear resistant member for electronic equipment as set forth in claim 1,
   wherein the number of the conductivity enhancing particles in an arbitrary straight-line distance of 30 μm in the silicon nitride sintered body is in the range from 5 to 20.

6. The wear resistant member for electronic equipment as set forth in claim 5,
   wherein the conductivity enhancing particles are present in the range from 3 to 30% in an arbitrary straight-line distance of 30 μm in the silicon nitride sintered body.

7. The wear resistant member for electronic equipment as set forth in claim 1,
   wherein the conductivity enhancing particles have an electrical resistivity of $10^{-5}$ Ω·m or less.

8. The wear resistant member for electronic equipment as set forth in claim 7,
   wherein the conductivity enhancing particles comprise at least one selected from carbides and nitrides of 4A group elements, 5A group elements, 6A group elements, 7A group elements, silicon and boron.

9. The wear resistant member for electronic equipment as set forth in claim 8, wherein the conductivity enhancing particles contain both the carbide particles and the nitride particles.

10. The wear resistant member for electronic equipment as set forth in claim 1,
wherein the silicon nitride sintered body contains an iron component in the range from 10 to 200 ppm.

11. The wear resistant member for electronic equipment as set forth in claim 1,
wherein the silicon nitride sintered body has a thermal conductivity of 40 W/m K or more.

12. The wear resistant member for electronic equipment as set forth in claim 1,
wherein the silicon nitride sintered body comprises, with respect to silicon nitride of 100 parts by mass, from 5 to 15 parts by mass of at least one selected from oxides and nitrides of 3A group elements, from 0.5 to 3 parts by mass of at least one selected from oxides and nitrides of 2A and 4A group elements, and from 15 to 40 parts by mass of at least one selected from carbides of 4A group elements, 5A group elements, 6A group elements, 7A group elements, silicon and boron.

13. The wear resistant member for electronic equipment as set forth in claim 12,
wherein the silicon nitride sintered body comprises 90% or more of silicon nitride grains of which the longer diameter is 4 $\mu$m or less.

14. The wear resistant member for electronic equipment as set forth in claim 13,
wherein the silicon nitride sintered body is 650 MPa or more in three-point bending strength.

15. The wear resistant member for electronic equipment as set forth in claim 13,
wherein the silicon nitride sintered body comprises 90% or more of silicon nitride grains of which the shorter diameter is 1 $\mu$m or less.

16. The wear resistant member for electronic equipment as set forth in claim 1,
wherein the silicon nitride sintered body comprises an inner layer and a surface layer containing the conductivity enhancing particles, the surface layer being lower in electrical resistivity than the inner layer.

17. The wear resistant member for electronic equipment as set forth in claim 1,
wherein the wear resistant member for electronic equipment is a ball bearing.

18. The wear resistant member for electronic equipment as set forth in claim 1,
wherein the wear resistant member for electronic equipment is used in a magnetic recorder or in an optical disk drive.

19. The wear resistant member for electronic equipment as set forth in claim 1,
wherein the wear resistant member for electronic equipment is used in a hard disk drive.

20. A bearing, comprising:
a ball bearing made of the wear resistant member for electronic equipment set forth in claim 1.

21. A spindle motor, comprising:
the bearing set forth in claim 20.

22. The spindle motor as set forth in claim 21, comprising:
a fixed shaft to which the bearing is attached;
a rotor supported rotatably through the bearing to the fixed shaft and having a rotor magnet; and
a stator having a stator coil disposed facing the rotor magnet with a prescribed gap.

23. A method of making the wear resistant member for electronic equipment of claim 1 comprising:
mixing a first powder of conductivity enhancing particles, the first powder having a maximum diameter of agglomeration of 10 $\mu$m or less, with a first silicon nitride powder to form a first mixed powder;
mixing a second powder of conductivity enhancing particles, the second powder having a maximum diameter of agglomeration of 10 $\mu$m or less, with a second silicon nitride powder to form a second mixed powder;
mixing at least the first mixed powder and the second mixed powder to form a third powder;
molding the third powder to form a molded shape; and
sintering the molded shape to form a silicon nitride sinter body, the sintered body comprising an agglomeration of the conductivity enhancing particles present in the range from 2 to 30% by area ratio per unit area in the silicon nitride sintered body.

24. The method of claim 23, further comprising:
mixing a fourth powder of conductivity enhancing particles, the fourth powder having a maximum diameter of agglomeration of 10 $\mu$m or less, with a fourth silicon nitride powder to form a fourth mixed powder; and
wherein the mixing at least the first mixed powder and the second mixed powder to form the third powder comprises mixing the first mixed powder, second mixed powder and fourth mixed powder.

25. A method of making the wear resistant member for electronic equipment of claim 1 comprising:
mixing a first powder of conductivity enhancing particles, the first powder having a maximum diameter of agglomeration of 10 $\mu$m or less, with a first silicon nitride powder to form a first mixed powder;
mixing at least one second powder of conductivity enhancing particles, the conductivity enhancing particles of the at least one second powder not forming agglomerations, with the first mixed powder to form a second mixed powder;
molding the second mixed powder to form a molded shape; and
sintering the molded shape to form a silicon nitride sinter body, the sintered body comprising an agglomeration of the conductivity enhancing particles present in the range from 2 to 30% by area ratio per unit area in the silicon nitride sintered body.

26. The method of claim 25, wherein the mixing at least one second powder of conductivity enhancing particles comprises:
sequentially mixing separate powders of conductivity enhancing particles, the conductivity enhancing particles of each separate powder not forming agglomerations, with the first mixed powder.

* * * * *